US006385611B1

(12) United States Patent
Cardona

(10) Patent No.: US 6,385,611 B1
(45) Date of Patent: May 7, 2002

(54) SYSTEM AND METHOD FOR DATABASE RETRIEVAL, INDEXING AND STATISTICAL ANALYSIS

(76) Inventor: Carlos Cardona, P.O. Box 22892, Seattle, WA (US) 98122-0892

( * ) Notice: Subject to any disclaimer, the term of this patent is extended or adjusted under 35 U.S.C. 154(b) by 0 days.

(21) Appl. No.: 09/565,219

(22) Filed: May 5, 2000

Related U.S. Application Data

(60) Provisional application No. 60/133,193, filed on May 7, 1999.

(51) Int. Cl.[7] .............................................. G06F 17/30

(52) U.S. Cl. .................................... 707/6; 707/2; 707/3

(58) Field of Search ............................... 707/5, 6, 3, 4, 707/9, 10, 2, 1

(56) References Cited

U.S. PATENT DOCUMENTS

| | | | |
|---|---|---|---|
| 5,535,382 A | 7/1996 | Ogawa | |
| 5,594,897 A | 1/1997 | Goffman | |
| 5,717,914 A | 2/1998 | Husick et al. | |
| 5,768,580 A | 6/1998 | Wical | |
| 5,787,421 A | 7/1998 | Nomiyama | |
| 5,794,236 A | 8/1998 | Mehrle | |
| 5,815,830 A | 9/1998 | Anthony | |
| 5,835,905 A | 11/1998 | Pirolli et al. | |
| 6,212,517 B1 * | 4/2001 | Sato et al. .................... | 707/5 |

OTHER PUBLICATIONS

Garfield, E., "Citation Analysis as a Tool in Journal Evaluation, Journals can be ranked by frequency and impact of citations for science policy studies," *Science* 178:471–479, Nov. 1972.

Garfield, E., "100 Citation Classic from the Journals of the American Medical Association," *JAMA* 257:52–59, Jan. 1987.

Key, J.D., "Citation Classics: Most–Cited Articles from Archives of PM&R," *Arch Phys. Med Rehabil* 69:1058–1059, Dec. 1988.

Balla, M.I. et al., "Can Bibliometric Indicators Assess Science and Technology? The Western World, Italian Institutions and Biophysics as Test Cases," *Cell Biophysics* 14:99–107, 1989.

Holman, B.L., "The Research That Radiologists Do: Perspective Based on a Survey of the Literature," *Radiology* 176:329–332, Aug. 1990.

(List continued on next page.)

*Primary Examiner*—Sanjiv Shah
(74) *Attorney, Agent, or Firm*—Christensen O'Connor Johnson Kindness PLLC

(57) ABSTRACT

The present invention provides a system and method with the capacity to compare and analyze keywords of a specific area of study. By the use of the methods of the present invention, some sets of keywords will be seen as "warming up" due to their upward trends, whereas other keywords might be seen as "cooling down" due to their downward trends. Given the accepted fact that growing areas of research are the ones that are more likely to produce scientific breakthroughs, the system identifies these emerging ("hot") areas of research would accelerate the scientific advances of their users. Similarly, users will be able to view and shift from non-productive ("cool") areas of research to productive "hot" areas. The invention involves the utilization of a commercially available database program and provides specific keywords associated with the investigated topic. The present invention also provides a method for indexing the keywords using a keyword tree structure database so the data is in the correct format for analysis. The invention also provides a method for analyzing the number of occurrences of keywords along with the analysis of an impact factor associated with the keywords. The formatted data then allows the construction of several charts so a user can easily assess the state and forefront of a specified topic.

25 Claims, 13 Drawing Sheets-

OTHER PUBLICATIONS

Luukkonen, T. "Bibliometrics and Evaluation of Research Performance," *Ann. Med.*, 22:145–150, 1990.

Ganiats, T.G. and Wong, A.F., "Evaluation of Cost–Effectiveness Research: A Survey of Recent Publications," *Fam. Med.* 23(6):457–462, Aug. 1991.

Roberts, W.C., Comparison of the Four Major USA Cardiology Journals in 1990: A Look at 51 Kilograms (112 pounds) of Journals and Over 15,000 Editorial Pages, *Am. J. Cardiol.* 65:551, Mar. 1991.

Dellon, L. et al., Impact of the Journal Plastic and Reconstructive Surgery, Plastic and Reconstructive Surgery 90:717–722, Oct. 1992.

Garfield, E. and Welljam–Dorof, A., "Of Nobel Class: A Citation Perspective on High Impact Research Authors," *Theoretical Medicine* 13:117–135, 1992.

Kuhlemeier, K.V., "A Bibliometric Analysis of the Archives of Physical Medicine and Rehabilitation," *Arch. Phys. Med. Rehabil.* 73:126–132, Feb. 1992.

Lutman, M., "Bibliometric analysis as a measure of scientific output," *Brit. J. Audiology* 26:323–324, 1992.

Pratt, G.F., "A decade of AIDS literature," *Bull. Med. Libr. Assoc.* 80(4):380–381, Oct. 1992.

Dame. M.A. and Wolinsky, F.D., "Communication: Rating Journals in Health Care Administration—The Use of Bibliometric Measures," *Medical Care* 31(6):520–524, 1993.

Larson, J.S. and Kershaw, R., "Rating Journals in Health Care Administration by the Textbook Citation Method," *Medical Care* 31(11):1057–1061, 1993.

Arndt, K.A., "My Journal is Smaller Than Your Journal," *Am. J. Dermatol.* 16(3):231–232, 1994.

Brooks, C.H., "Scholarly Debate: Perceived Quality and Citation Rates of Health Care Administration Journals," *Medical Care* 32(6):650–652, 1994.

Dame, M.A. and Wolinsky, F.D., "Reconciling Differences in Rating the Quality of Health Care Administration Journals Between Program Chairs Perceptions and Citation Counts: Cutting Edge, Historical Seniority, Mainstream, Measurement Error Or Political Correctness," *Medical Care* 32(6):653–655, 1994.

Lawson, M., "Citation analysis confirms Australian science's declining influence," *Nature* 370:86, Jul. 1994.

Lowe, H.J. and Barnett, G.O., "Understanding and Using the Medical Subject Headings (MeSH) Vocabulary to Perform Literature Searches," *JAMA* 271(14): 1103–1108, Apr. 1994.

Welljams–Dorof, A. "Biological sciences in Chile and South America, 1981–1991: A citationist perspective. Output data and specialty are impact trends," *Biol. Re.* 27:91–103, 1994.

Paolo, F. and Barten, S.S., "An 'ethics gap' in writing about bioethics: a quantitative comparison of the medical and the surgical literature," *J. Medical Ethics* 21:84–88, 1995.

Roelants, G., "Which health journals are most useful?" *World Health Forum* 16:69–73, 1995.

Butler, D. "French citations forge ahead but Europe still loses ground," *Nature* 379:575, Feb. 1996.

Garfield, E., "How can impact factors be improved?" *BMJ* 313:411–413, 1996.

Schena, F.P. and Zoccali, C., "Bibliometric analysis of the specific productivity of the Italian Society of Nephrology for a period of five consecutive years (1990–1994)," *Neprhol. Dial. Transplant* 11:2359–2360, 1996.

Smith, G., "Impact factors in anaesthesia journals," *Brit. J. Anaesthesia* 76:753–754, Jun. 1996.

Sorokin, N.I., "Impact factors of Russian journals," *Nature* 380:578, Apr. 1996.

Wood–Dauphinee, S., "Quality–of–Life Assessment: Recent Trends in Surgery," *JCC* 39(5):368–372, Oct. 1996.

Anonymous, Definitions. ISI. SCI® Journal Citation Reports, pp. 10–18, 1997.

Anonymous, Key Figures from the Journal Rankings. ISI. SCI® Journal Citation Reports, pp. 51–102.

Greenhalgh, T., "How to read a paper. The Medline database," *BMJ* 315:180–183, 1997.

Howard, L. and Wilkinson, G., "Impact factors of psychiatric journals," *British J. Psychiatry* 170:109–112, 1997.

Miflin, B., "Institutes top UK science league table," *Nature* 390:12, Nov. 1997.

Opthof, T., "Sense and nonsense about the impact factor," *Cardiovasc. Res.* 33:1–7, 1997.

Fontanarosa, P.B., "Impact Factors and Emergency Medicine Journals," *Ann Emerg Med* 31:107–109, Jan. 1998.

Garfield, E., "From Citation Indexes to Informetrics: Is the Tail Now Wagging the Dog?" *Libri* 48:67–80, 1998.

Garfield, E., "Random Thoughts on Citationology—Its Theory and Practice," *Scientometrics* 43(1):69–76, 1998.

Hecht, F. et al., "The Journal "Impact Factor": A Misnamed, Misleading, Misused Measure," *Cancer Genet Cytogenet* 104:77–81, 1998.

P. Mestecky, "Impact Factors—Handle with care," *Materials Today* 1:8–12, 1998.

Seglen, P.O., "Citation rates and journal impact factors are not suitable for evaluation of research," *Acta Orthop. Scand* 69(3):224–229, 1998.

Walsh, E.F. and Weinstein Spine, J.N., "Scientific Citation Index and its Impact Factor," *Spine* 23(10):1087–1090, 1998.

Cox, B.J. et al., "Citation Patterns in Anxiety Disorders Research in 14 Journals: 1990–1991," *Am. J. Psychiatry* 151:933–936, Jun. 1994.

\* cited by examiner

SYSTEM AND METHOD FOR DATABASE RETRIEVAL, INDEXING AND STATISTICAL ANALYSIS

This application claims priority from applicants' co-pending U.S. provisional application entitled "SYSTEM AND METHOD FOR DETERMINING TRENDS IN A SPECIALIZED AREA", bearing provisional application No. 60/133,193, filed May 7, 1999, and incorporated herein by reference.

FIELD OF THE INVENTION

The present invention generally relates to database retrieval methods, and more particularly, to a search method that provides quantifiable analysis for determining the distribution and evolving or declining topics within a specialized area.

BACKGROUND OF THE INVENTION

Databases are software tools that contain records. These records are arranged in different fields. Some of the fields that can be found in a bibliographic database might include some of the following: title of the book or article, authors, institution(s), source, abstract, keywords, bibliography, etc. This sort of arrangement allows the user to search in a field or a combination of fields (utilizing Boolean terms; and, or, not) to find desired information.

The bibliography field typically contains one or more citations. A citation may acknowledge the source of another document that is cited as a support for a point of view, or as an authority. In the past, Eugene Garfield, Ph.D. at the Institute for Scientific Information® (ISI) has used the bibliographic field format to produce statistical data. One of these sets of statistical data pertains to what is known as the Citation Index by which the frequency of a citation reflects the impact that such publication has had within its discipline. This concept is known as Impact Factor. ISI publishes on a yearly basis a list containing thousands of journals according to their ranked Impact Factor and their relation to a plurality of specific subjects (Journal Citation Reports®, JCR®). Other lists provided by ISI categorize journals by immediacy index, citation half-life, total number of citations, etc.

ISI also works in the area known as bibliometrics. As proposed by Pritchard in 1969, bibliometrics has been defined as "the application of mathematics and statistical methods to books and other media of communication". Thus, ISI has been addressing the following questions: What are the largest journals? What journals are the most frequently used? What are the "hottest" journals? What are the "hottest" articles? What journals have the highest impact factor? What publications does a journal cite, and which ones cite it? What is the historical origin of a new topic, etc.?

ISI and others have expanded this technology and are now capable of addressing other questions outside of the bibliographic field, thus giving rise to the science of informetrics. Other questions being addressed include authorship, country, institution and journal analysis, etc. The areas impacted by this type of analysis cover a wide-spectrum of subjects including: broadcasting, ethics, geology, psychology, management, chemistry, biology, medicine, etc.

Despite this progress in the informetrics field a couple of fundamental questions remain unanswered: What is happening in a specific topic; and what is at the forefront of that topic. Prior methods for predicting trends in specialized areas include hiring consultants that provide an opinion on the evolving areas. Some disadvantages with using consultants are that: (1) Consultants are expensive and typically limited to only their specific area of expertise; and (2) Consultants may incorporate their preferences into the opinions without easy detection. Thus, their opinions might be biased. A research facility interested in directing their research efforts at the evolving areas, to maximize their funding for research projects must expend a large amount of money to hire multiple consultants that will predict trends for each specialty within the research facility. Another disadvantages is that even after this large expenditure of money, the research facility still does not know the relative funding to apply between the specialties due to the speculative nature of consulting.

Databases contain a concept tree structure composed of keywords. These keywords are tags assigned to each article in the database so that any user can retrieve the same articles with consistency. Thus, these keywords operate as a means to recognize specific articles related to that topic. Prior art computer retrieval systems have been able to combine specific keywords with a set of journals. However, these systems lack the statistical analysis, depth, integrity, comprehensiveness and completeness required to consider these studies scientific. Furthermore, there are no published studies or systems that address the specific questions of what is happening in a specific topic, or what is at the forefront of that topic by the use of keywords database and/or keyword tree structures. Given these limitations, there is a need for a system of analyzing trends in research in a way that is efficient, unbiased and reproducible. In addition, a system that would allow a user to know the distribution of specific keywords in a given topic does not exist.

SUMMARY OF THE INVENTION

The present invention provides a system and method with the capacity to compare and analyze keywords of a specific area of study. By the use of the methods of the present invention, some sets of keywords will be seen as "warming up" due to their upward trends whereas other keywords might be seen as "cooling down" due to their downward trends. Given the accepted fact that growing areas of research are the ones that are more likely to produce scientific breakthroughs, the system identifies these emerging ("hot") areas of research that may accelerate the scientific advances of users. Similarly, users are able to view and shift from non-productive ("cool") areas of research to productive "hot" areas.

The process involves the utilization of a database program and provides specific keywords associated with the investigated topic. The present invention also provides a method for indexing the keywords using a keyword tree structure so the data is in the correct format for analysis. The process also provides a method for analyzing the number of occurrences of keywords along with the analysis of an impact factor associated with the keywords. The formatted data then allows the construction of several charts so a user can easily assess the state and forefront of a specified topic.

The process involves the input of the name of the journal to be investigated, removal of the none-original articles such as editorials, news, comments, etc from the query built in the retrieval process, limiting the query by the different years to be investigated, and downing the articles according to the years or group of years to be investigated.

In another embodiment, the process is best suited for the study of a keyword or a small set of keywords that do not require a pre-search to find out the specialized area keywords. The purpose of this process is to find additional keywords that other keywords relate with. Thus, this embodiment does not require to select any journals from the database since the user wishes to know which keywords relate to its query regardless where it is published. Input the keyword(s) into the query and remove none-original articles such as editorials, news, and comments from the query, limit it by the different years to be investigated and download the articles according to the years or group of years to be investigated. This process accounts for all of the focused keywords. The process of this embodiment then calculates a correction factor and applies it following pre-indexing process. The process then continues to the index step to sort the keywords. The process then proceeds with the statistical analysis.

This type of investigation provides the user with a tool to know which are the areas related to the keyword or small set of keywords under investigation. One interesting aspect of it is to find out new correlations of this keyword(s) with unsuspected topics. This type of search is particularly appealing to anyone searching for new uses. For instance, very often pharmaceutical compounds have multiple applications. Novel research that applies to a related compound to the one being investigated might be picked up by the user's search since they might be sharing higher hierarchical keywords.

In another embodiment, the process combines the specialized keywords and a selection of all the specialty journals available with the top non-specialty journals with the highest impact factor than the best specialized journal. The question best addressed with this system is "what is happening in a specialized area of research."

The information provided by this method provides managers with a novel tool to establish current needs and anticipate future requirements that will ultimately maximize their efforts and gains. Beneficiaries of this system would include the following: scientists, managers, strategists, venture capitalists, investment bankers, foundations, information and market analysts, publishers, historians, etc. At the institutional level, the beneficiaries include: companies, non-profit organizations, research centers and governments agencies. The present unbiased and quantifiable system and method allows a user to see the reality of past and present topics' distribution and trends within a specialized area. Moreover, by extrapolation of the data a forecast of future trends is made possible.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a method for determining distributions and trends in a specialized area. The method involves counting keywords and organizing the keywords according to a pre-determined keyword-tree structure. The method operates in a computing environment with access to databases containing journals and their respective articles. JCR® ratings that determine and classify journals by impact factor and their subjects are used to operate the system.

The present invention is a quantifiable database system and method consisting of three sequential steps: keyword retrieval, indexing and statistical analysis. The output of the statistical analysis allows a user to determine the distribution and trends in a specialized area of interest. The area of interest can be a very broad topic such as biomedical research or clinical neurology. Alternatively, the area of interest can be of an intermediate breadth such as schizophrenia; or the area of interest can be a more narrowed topic such as aspirin. The system gives the user an overview of a selected topic and defines the areas that are most relevant. The method of the present invention provides analysis for two questions: (1) what is happening in a specialized area and, (2) what are the emerging topics, referred to as getting "hot," as well as the topics that are "cooling down."

Elements needed to Operate the System
(1) Computing and Network Environment

The present invention may be embodied in a computer program or in another type of program module embodied in a set of instructions encoded on a computer readable medium such as a tape, CD, disk drive or the like or transmitted over a communication link such as the Internet.

Figure 1:
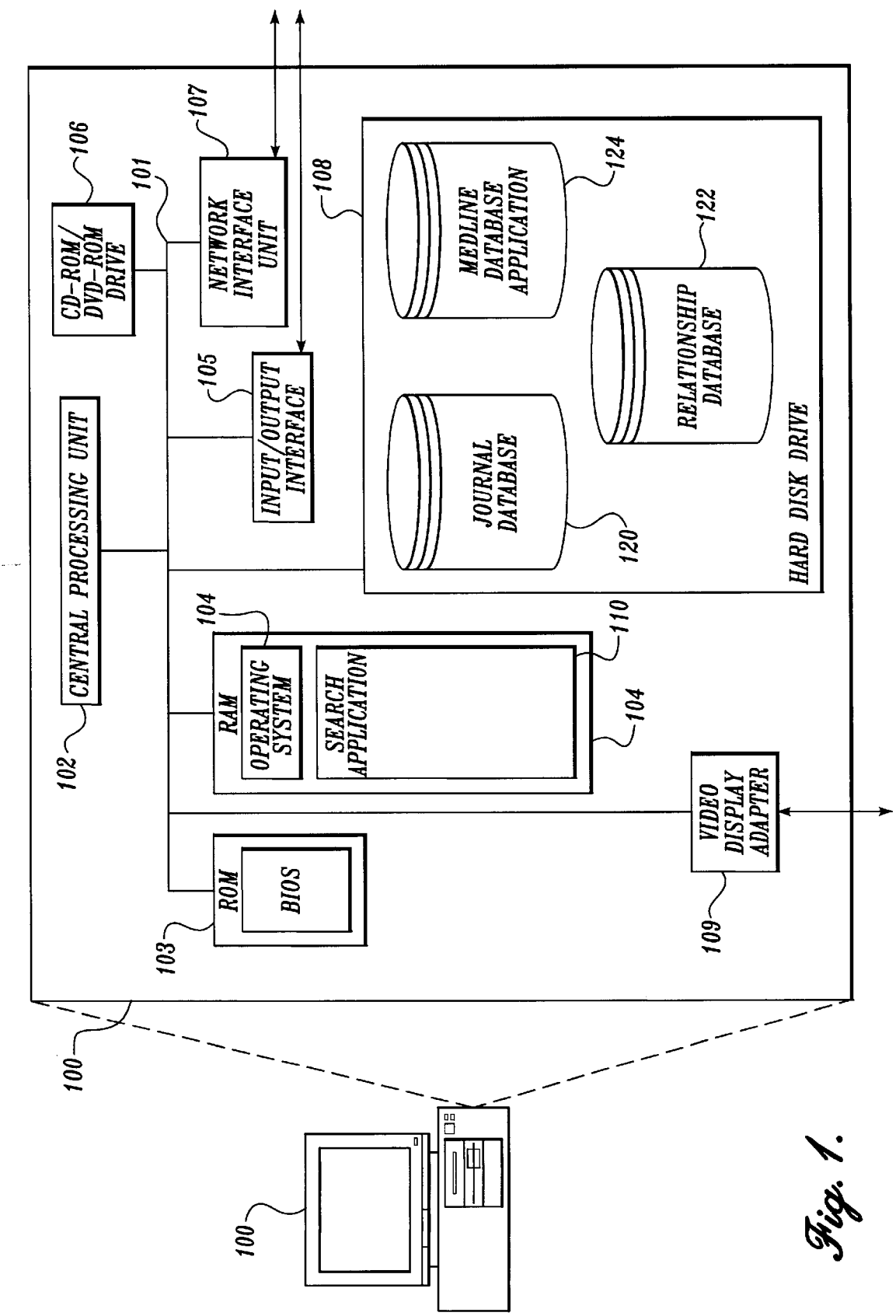
FIG. 1 is a block diagram of a computer in accordance with the present invention.

FIG. 1 depicts several of the key components of a computer 100. Those of ordinary skill in the art will appreciate that a computer 100 includes many more components then those shown in FIG. 1. However, it is not necessary that all of these generally conventional components be shown in order to disclose an illustrative embodiment for practicing the present invention. As shown in FIG. 1, the design of the computer 100 includes read-only memory ("ROM") 103, a central processing unit 102, a video display adapter 109, and random access memory ("RAM") 104. The ROM 103 stores an operating system 111 for controlling the operation of the computer 100. The RAM 104 also includes a medium to store a software application 110 as described in more detail below. It will be appreciated that these software components may be stored on a computer-readable medium and loaded into memory 204 of the client computer using a drive mechanism associated with the computer-readable medium, such as a floppy drive, a CD-ROM/DVD-ROM drive 106, or a hard drive 108. A relational database may also be stored on the hard drive 108 for assisting the process of the software application 110.

An input/output interface 105 may also be provided for receiving input from a mouse, keyboard, or other input device. In addition, standard components such as a video display adapter 109 could be included to provide an output to the user. The computer 100 may also include a network interface unit 107 for allowing communicating with other computing units. The network interface unit 107 is also used for connecting to a LAN or WAN, or for connecting remotely to a LAN or WAN. Those of ordinary skill in the art will appreciate that the network interface unit 107 includes the necessary circuitry for such a connection, and is also constructed for use with the TCP/IP protocol, the particular network configuration of the LAN or WAN it is connecting to, and a particular type of coupling medium. The client computer may also be equipped with a network interface unit 107 capable of connecting to the Internet through a point to point protocol ("PPP") connection or a SLIP connection as known to those skilled in the art.

The ROM 103, RAM 104, network interface unit 107, video display adapter 109, and input/output interface 105 are all connected to the central processing unit 102 via a bus 101. Other peripherals may also be connected to the central processing unit 102 in a similar manner. These components act in concert to implement the methods of the software application 110, described in further detail below.

Figure 2:
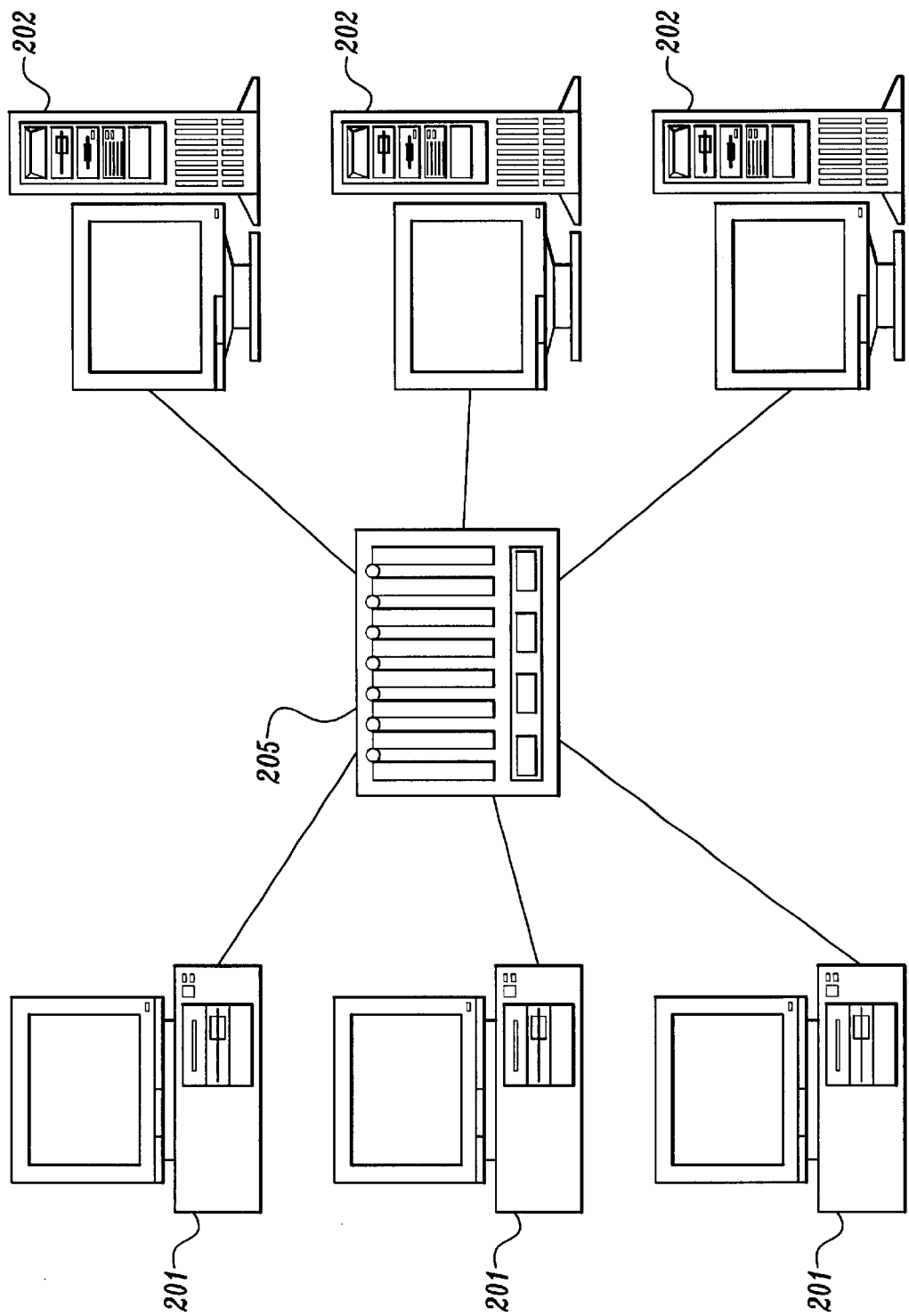
FIG. 2 is a block diagram of a plurality of computing devices of FIG. 1 connected to a network.

In another embodiment, the present invention can be implemented on a network of computing devices that includes a plurality of clients 201 and servers 202. FIG. 2 is a portion of an exemplary network 205 on which the invention is alternatively implemented. Although not necessary to realize the advantages of the present invention, network 205 can be part of a wide area network (WAN) in which different geographical locations are interconnected, either by high-speed data lines or by radio links, perhaps interconnecting hundreds of client computers 201 at widely disparate locations. Although the block diagram of FIG. 2 only depicts three servers 205, a network, and three clients 201, it will be understood by those of ordinary skill in the art that the present invention is also useable on other types of network configurations, such as a token ring or star configuration having a different number of clients 201 and servers 202. A web browser may then be used on the workstation to access the server. This type of architecture is well known in the art of network computing.

As shown in FIG. 1, the computer 100, which may be the configuration of the client 201 or server 202, include at least one hard drive on which are stored a plurality of files, including data and applications that can be accessed by the computing devices 201 and 202. As mentioned earlier, the clients 201 may access the servers 202 through network 205. The network may include a local area network, wide area network, or the Internet.

FIG. 2 shows a network environment using a client/server architecture where the database of the present invention resides on a storage device accessible by a retrieval engine in the server 202. Although FIG. 2 shows one configuration of a computing environment that may be used to implement the methods of the present invention, one skilled in the art would recognize that the present invention may be operated in a stand-alone environment as shown in FIG. 1.

A user at one of the client computers 201 may enter their desired database query that is sent over the network 205 to the retrieval engine resident on one of the servers 202. The retrieval engine retrieves the requested information from the database and the server returns the information to the client 201. Typically, the information that is returned is stored in a file on a hard disk on the client 201. Once all the necessary queries have been performed, the user may manipulate the retrieved data files with any application, such as a word processor. The method for manipulating the data in accordance with one embodiment of the present invention is described in more detail below.

(2) Databases

The database 122 as shown in FIG. 1 contains a plurality of journals related to a specific topic area. The database includes several fields for each article including authors, source, institution, title, keywords, abstract, etc. Articles can be retrieved using keywords and these keywords are arranged in a tree structure. Articles and their respective fields can be downloaded and further manipulated with adequate software for analysis. The example used in this patent illustrates a database for use in medicine and biology provided by the National Library of Medicine, known as MEDLINE, and is available through the Internet. However, the present invention may also use a database in other areas such as astronomy, computing, chemistry, engineering, physics, sociology, art, philosophy, etc.

TABLE 1 is an example of an article download from the MEDLINE database showing some of the above-described fields.

TABLE 1

<1>
Authors
    Saitta A M. Soper P D. Wasserman E. Klein M L.
Institution
    Center for Molecular Modeling, Department of Chemistry, University of Pennsylvania, Philadelphia 19104-6202, USA.
Title
    Influence of a knot on the strength of a polymer strand.
Source
    Nature. 399(6731):46–8, 1999 May 6.
MeSH Subject Headings
    *Alkanes/ch [Chemistry]
    Carbon/ch [Chemistry]
    Computer Simulation
    Models, Chemical
    Molecular Structure
    *Polymers/ch [Chemistry]
    Structure-Activity Relationship
    Support, U.S. Gov't, Non-P.H.S.
    Temperature TABLE 1-continued Registry Numbers
0 (Alkanes). 0 (Polymers). 124-18-5 (decane). 7440-44-0 (Carbon).
...
...

(3) User

It is preferred that the user of the system and method of the present invention be knowledgeable in the subjects being investigated. In order for the user to be able to address a broad question such as "which are the keywords related to clinical neurology?" or an intermediate question such as "which are the keywords related to schizophrenia?", a pre-search to determine the keywords of the subject being investigated is desirable to increase the method's sensitivity and reliability. Furthermore, interpretation of the final data will be maximized if the user of the system and method of the present invention is knowledgeable in the investigated subject.

There may be a few instances where a user may not be knowledgeable in an area being investigated. Similarly, a user may be interested in investigating a simplistic topic, such as a information on a generally known subject such as aspirin, a pre-search or prior knowledge may not be needed. In both instances a user can still utilize the present invention.

(4) Software

Software that enables the user to arrange, tag, count, index and perform the statistical analysis is most desirable since the amount of data that can be handled can very often be overwhelming (hundreds of thousands of articles; millions of keywords). Nevertheless, for a small search (addressing a small topic or one with a small number of articles) a less software oriented method can be applied. The assistance of a word processor that can sort out keywords alphabetically would suffice to pre-arrange the keywords. If patience is in the nature of the user, each keyword will need to be counted by frequency (number of times that the word is encountered). Following counting, keywords should be indexed and classified according to a pre-determined keyword tree structure. An important limitation of an embodiment of the system without sophisticated software is that the user will not be able to tag each keyword in each article with its correspondent impact factor. Similarly, a multiplication of frequency by impact factor will not be possible either. Nor will it be possible to know the average impact factor/frequency of all keywords under study.

In order to speed up the process, allow the user to handle a great number of articles at a time and make it a more refined, the present invention is preferably implemented with a software program that carries out the steps of the methods described in more detail below.

Problem to be Resolved

Two questions can be addressed with the present invention:

1) What is what is happening in a specific topic?

2) What is at the forefront of that topic?

In other words, question number one addresses the status of a specific topic, while question number two identifies the most relevant areas. Derived from these two questions are other sub-questions that can be addressed by the use of the methods of the present invention. In the biomedical example used in this disclosure, the following would be some examples of sub-questions that could be addressed:

What are the most frequently used cells?

What are the most frequently used organs?

Which are the most relevant molecules?

Which are the most relevant biochemical events?

Which are the most relevant genetic events?

Which are the most relevant physiological events?

Which are the top pathological processes?

Which are the most relevant diagnostic techniques?

Which are the most attractive therapeutic approaches?

Which are the most relevant pharmacological compounds?

Figure 3:
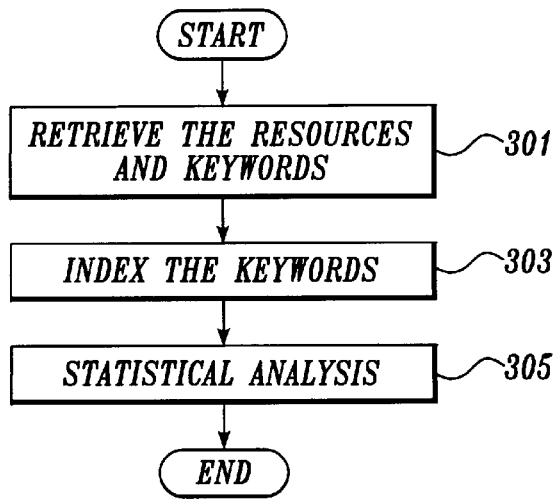
FIG. 3 is a flow diagram depicting the three major steps of a database analysis process according to one embodiment of the present invention.

FIG. 3 is an illustrative routine 300 for the database analysis that determines the status of a specific topic and the forefront of that topic. The process starts at step 301 where the user retrieves the resources of the search. In summary, and as described in more detail below, this step includes the identification of keywords related to the user selected topic, selecting journals related to the topic, and combining the system. Next, as shown in step 303, the process continues where the system indexes the selected keywords. This step involves arranging the data of prior indexing, indexing the current keywords, and into a database keyword tree structure. Next, at a step 305, the process continues where the system runs a statistical analysis according to the set of sub-questions being addressed.

Figure 4:
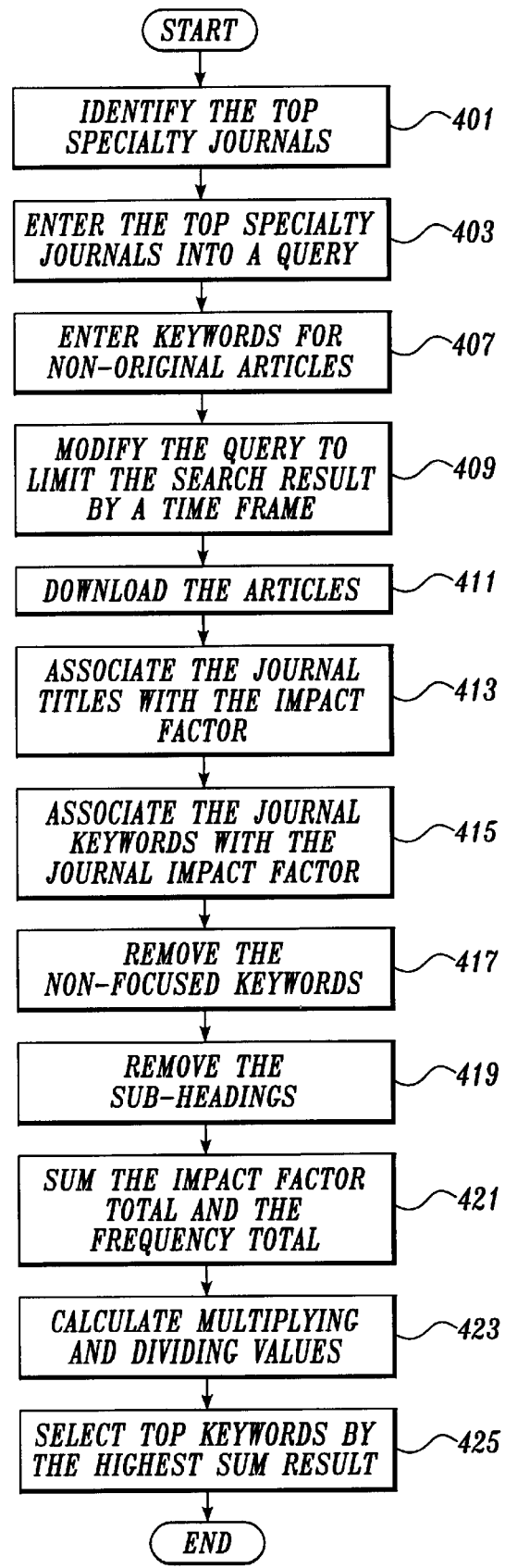
FIG. 4 is a flow diagram depicting one embodiment of a retrieval process of the present invention, wherein the retrieval process analyzes the keywords in a plurality of articles.

Referring now to FIG. 4, the retrieval step 301 of FIG. 3 is now shown in more detail. The retrieval routine allows a user of the system to identify keywords of a specific topic. The retrieval routine is also referred to as the pre-search process. This process allows a user to identify the keywords of a topic by using the top journals in the topic of question. The retrieval routine allows a user to find the most relevant keywords of a broad or intermediate subject in which the user might not have a great deal of expertise.

The retrieval routine begins at block 401 where the user identifies the top specialty journals. Here the computing device 100 shown in FIG. 1, houses a database 122 which contains and utilizes all journals or a set of journals, e.g. the top 10 journal according to their impact factor, selected from the JCR® list under the desired topic. Here, the database of journals 122 will be arranged such that the heading of the JCR® can be searched by the user by entering the desired topic in a database search. In the following illustrative example, the desired topic of *clinical neurology* will be used. TABLE 2 is an example of the journals associated with the heading of *clinical neurology* in the JCR®. TABLE 2 lists the JCR® top ten journals, ordered by JCR's impact factor.

TABLE 2

| Rank | Journal Title | Impact Factor |
|---|---|---|
| 1 | annals of neurology | 9.513 |
| 2 | brain pathology | 5.663 |
| 3 | brain | 5.381 |
| 4 | journal of clinical psychopharmacology | 5.094 |
| 5 | neurology | 4.526 |
| 6 | stroke | 4.323 |
| 7 | journal of neuropathology & exper. neurology | 4.253 |
| 8 | archives of neurology | 3.779 |
| 9 | schizophrenia bulletin | 3.509 |
| 10 | pain | 3.318 |

The process then proceeds to step 403 where the program of the present invention builds a database query based on the result of the first database search. In this example, the program utilizes the title of the top ten journals. The query built in this example can be in a format that conforms to a standard database program such as MEDLINE database software offered by the *National Library of Medicine*. Alternatively, other generic database programs such as Microsoft SQL™ can be used with methods of the present invention.

Although the present example only uses the top ten journals, step 403 can use all of the journal titles listed in the JCR®. TABLE 3 is an example the database query built from the list of discovered journal titles found in step 401.

TABLE 3

| 1  | annals of neurology                              |
|----|--------------------------------------------------|
| 2  | brain pathology                                  |
| 3  | brain                                            |
| 4  | journal of clinical psychopharmacology           |
| 5  | neurology                                        |
| 6  | stroke                                           |
| 7  | journal of neuropathology & experimental neurology |
| 8  | archives of neurology                            |
| 9  | schizophrenia bulletin                           |
| 10 | pain                                             |

Next, at a step 405, the program modifies the database query by placing the Boolean value, "OR," between each entry. Thus, the search string may be:

11 1 or 2 or 3 or 4 or 5 or 6 or 7 or 8 or 9 or 10

The process then proceeds to a step 407 where the program enters the keywords to narrow the search query. As a matter of background, journals such as the JCR® include editorials, news, comments, news, letters, clinical conference notes, interview summaries, and reviews in addition to the main feature articles (original articles). Since the purpose of the present invention is to obtain data to address what is happening and what is emerging or receding in a specific field, the non-original articles should be removed from the database query. Thus, data obtained from this database query will not be tainted with articles related to non-scientific studies. TABLE 4 is an illustrative example of some of the terms that limit the search query.

TABLE 4

| 12 | editorial           |
|----|---------------------|
| 13 | news                |
| 14 | comments            |
| 15 | news                |
| 16 | letters             |
| 17 | clinical conference |
| 18 | interviews          |
| 19 | reviews             |
| 20 | anonymous           |

The search terms used in step 407 should be entered in the database query using the Boolean term "OR". Thus, the following text can be added to the query.

21 12 or 13 or 14 or 15 or 16 or 17 or 18 or 19 or 20

In addition, the keywords associated with the non-original articles must be negated. Thus, the search string should also include Boolean term "NOT" to eliminate the non-original articles. Thus, the following text can be added to the query.

22 11 not 21

Next, a step 409, the database query is limited by a user specified time frame. This will limit the search results to specific articles published in specified years so the final analysis of the program will reflect the most relevant trends in the subject matter of interest. In the example shown in TABLE 5, the database query is modified to only articles published within the timeframe of 1990 through 1998.

TABLE 5

| 23 | limit 22 to yr=1998 |
|----|---------------------|
| 24 | limit 22 to yr=1997 |
| 25 | limit 22 to yr=1996 |
| 26 | limit 22 to yr=1995 |
| 27 | limit 22 to yr=1994 |
| 28 | limit 22 to yr=1993 |
| 29 | limit 22 to yr=1992 |
| 30 | limit 22 to yr=1991 |
| 31 | limit 22 to yr=1990 |

The keyword thesaurus of any database changes to some extent in a yearly basis with the introduction of new keywords and elimination of outdated ones. In order to obtain all possible keywords during the aforementioned timeframe, the database queries 23 to 31 should be linked with the logical Boolean term "OR." Thus, the following text can be added to the query.

32 23 or 24 or 25 or 26 or 27 or 28 or 29 or 30 or 31

As shown at a step 411, once the database query is constructed using steps 401–409, the query is processed in the database program so the database program appropriately retrieves the articles. In the download step 409, it is preferred that the database program be configured to download all of the articles revealed by the database query. It is preferred that the database program be configured such that database search result is formatted as shown in TABLE 6. TABLE 6 illustrates that the database search results include the name of the journal, also referred to as the source, and the subject headings from the MEDLINE, otherwise known as the MeSH subject headings. The MeSH subject headings are used as keywords in the subsequent steps of the present invention. The example of TABLE 6 shows two records of a search result having seven thousand articles. The database search results are then stored in a file on the computer hard drive.

There are two types of keywords in the MeSH subject headings available from MEDLINE. The first type of keywords represent the general subject matter of the article found in the journal. MEDLINE indicates these types of MeSH subject headings by marking them with an asterisk (*). The present invention utilizes these marked headings and refers to them as focused keywords. As shown in TABLE 6, when the articles are received in step 411, the database query result maintains a record of these focused keywords. The second type of MeSH subject heading indicates that an article covers a secondary or collateral issue. These secondary keywords are not marked with an asterisks in the search result file and are referred to as non-focused keywords.

TABLE 6

<1>
Source
    Nature. 399(6731):46–8, 1999 May 6.
MeSH Subject Headings
    *Alkanes/ch [Chemistry]
    Carbon/ch [Chemistry]
    Computer Simulation
    *Coronary Artery Bypass/mt [Mortality]
    Models, Chemical
    Molecular Structure
    *Polymers/ch [Chemistry]
    Structure-Activity Relationship
    Support, U.S. Gov't, Non-P.H.S.
    . . .
    . . .
<7000>

TABLE 6-continued

Source
    Journal of Cardiac Surgery. 13(5):318–27, 1998 Sep–Oct.
MeSH Subject Headings
    Adolescence
    Adult
    Aged
    Aged, 80 and over
    Child
    Child, Preschool
    Comparative Study
    Coronary Angiography
    Coronary Artery Bypass/mo [Mortality]
    *Coronary Artery Bypass/mt [Methods]
    Coronary Disease/ra [Radiography]
    *Coronary Disease/su [Surgery]
    Female
    Follow-Up Studies
    Human
    Infant
    Male
    Middle Age
    *Polymers
    Prospective Studies
    *Radial Artery/tr [Transplantation]
    Survival Rate
    Treatment Outcome Next, the process continues at a step 413 where tags are set in the file containing the search results. As shown in TABLE 7, this step involves associating the corresponding impact factor of each journal title. This step can modify the data file in any format as long as there is an association between each journal and its corresponding impact factor. In one illustrative example, TABLE 7 shows the journal titles discovered in the database query of steps 401–411 as modified by the association step 413.

TABLE 7

| Journal Title | Impact Factor |
|---|---|
| abdominal imaging | 0.617 |
| academic emergency medicine | 1.042 |
| academic medicine | 1.033 |
| ... | ... |
| ... | ... |
| journal of cardiac surgery | 1.325 |
| ... | ... |
| ... | ... |
| nature | 27.368 |
| ... | ... |
| ... | ... |
| zoomorphology | 0.821 |
| zuchtungskunde | 0.218 |
| zuckerindustrie | 0.364 |

Next, as shown at a step 415, the process continues where each focused keyword(s) associated with each journal article is associated with the journal's corresponding impact factor. Thus, each article contains keywords tagged with an impact factor that is associated with the journal title. For example, if journal X is associated with an impact factor of 20.123, then all of the keywords in that journal will be associated with an impact factor of 20.123.

TABLE 8 is an example of a file containing the search results on the data file, where the keywords are tagged corresponding with their journal impact factor. In this example, the journal *Nature* and the *Journal of Cardiac Surgery* have impact factors of 27.368 and 1.325, respectively. Also shown in TABLE 8, step 415 only associates the focused keywords with the impact factors. As described above, the focused keywords are only those MeSH subject headings indicating that the heading is associated with the substance of the article. Thus, in the following example of TABLE 8, the file only associates the impact factor of 27.368 with the keywords: Alkanes, Coronary Artery Bypass, and Polymers.

TABLE 8

<1>
Source
    Nature. 399(6731):46–8, 1999 May 6.
MeSH Subject Headings
    27.368  *Alkanes/ch [Chemistry]
                Carbon/ch [Chemistry]
                Computer Simulation
    27.368  *Coronary Artery Bypass/mt [Mortality]
                Models, Chemical
                Molecular Structure
    27.368  *Polymers/ch [Chemistry]
                Structure-Activity Relationship
                Support, U.S. Gov't, Non-P.H.S.
    ...
    ...
<7000>
Source
    Journal of Cardiac Surgery. 13(5):318–27, 1998 Sep–Oct.
MeSH Subject Headings
                Adolescence
                Adult
                Aged
                Aged, 80 and over
                Child
                Child, Preschool
                Comparative Study
                Coronary Angiography
                Coronary Artery Bypass/mo [Mortality]
    1.325  *Coronary Artery Bypass/mt [Methods]
                Coronary Disease/ra [Radiography]
    1.325  *Coronary Disease/su [Surgery]
                Female
                Follow-Up Studies
                Human
                Infant
                Male
                Middle Age
    1.325  *Polymers
                Prospective Studies
    1.325  *Radial Artery/tr [Transplantation]
                Survival Rate
                Treatment Outcome As an alternative step, the process continues to a step 417 where the non-focused keywords are removed from the file containing the search results. One purpose of the pre-search process shown in FIG. 4 is to determine the most utilized and relevant keywords of the subject under investigation. Therefore, all the keywords lines that are not marked with an asterisk are removed from the data file. TABLE 9 illustrates an example of the data file of TABLE 8 with the non-focused keywords removed from the file.

TABLE 9

27.368  *Alkanes/ch [Chemistry]
27.368  *Coronary Artery Bypass/mt [Mortality]
27.368  *Polymers/ch [Chemistry]
...
...
1.325  *Coronary Artery Bypass/mt [Methods]
1.325  *Coronary Disease/su [Surgery]
1.325  *Polymers
1.325  *Radial Artery/tr [Transplantation]

As another alternative step, the process may also include a step 419 where the sub-headings are removed from the data file. This step allows the program to further distinguish the keywords.

As a matter of background, some of the keywords in the MeSH subject heading will include subheadings. Subheadings are utilized by the cataloguers at the National Library of Medicine to refine the contents of a keyword. They are identifiable because they follow a "/" at the end of the keyword with an acronym of two letters followed by a bracketed explanation of the acronym. For instance, the example of TABLE 9 shows the keyword "*Coronary Artery Bypass/mt [Mortality]" and "*Coronary Artery Bypass/mt [Methods]." In the first keyword, the focused keyword Coronary Artery Bypass was used in an article that was explaining the mortality caused by this surgical procedure. In the second keyword, the term subheading shows that the article of coronary artery bypass is related to the study of surgical methodology. In some instances, the keywords do not contain any subheading such as the second occurrence of the term "polymers."

For the purpose of addressing the question on how to obtain the journal's keywords, it is irrelevant whether keywords contain or do not contain subheadings. To clarify this point the method removes all subheadings allowing process to easily compare all focused keywords. TABLE 10 is an example of the data file of TABLE 9 where the subheadings are removed.

TABLE 10

| | |
|---|---|
| 27.368 | *Alkanes |
| 27.368 | *Coronary Artery Bypass |
| 27.368 | *Polymers |
| ... | |
| ... | |
| 1.325 | *Coronary Artery Bypass |
| 1.325 | *Coronary Disease |
| 1.325 | *Polymers |
| 1.325 | *Radial Artery |

At this point, the process continues to a step 421 where two summation parameters are determined. First, the process sums the impact factors associated with identical keywords. Thus, the impact factor sum increases each time a keyword appears in the search. Second, the process sums the total number of times the keywords appeared in the articles. TABLE 11 is an example of a data file that shows the sum of the impact factors based on the keyword data of TABLE 10. Correspondingly, TABLE 12 is an example of a data file that shows the sums of the total number of times the keywords appeared in the articles based on the data of TABLE 10. It is preferred that the summed numbers of TABLE 11 and 12 are stored in a data file on the computer hard drive.

TABLE 11

Impact factor summation output

| | |
|---|---|
| 28.693 | Coronary Artery Bypass |
| 28.693 | Polymers |
| 27.368 | Alkanes |
| 1.325 | Coronary Disease |
| 1.325 | Radial Artery |
| . | . |
| . | . |
| . | . |

TABLE 12

Freguency Output

| | |
|---|---|
| 2 | Coronary Artery Bypass |
| 2 | Polymers |
| 1 | Alkanes |
| 1 | Coronary Disease |
| 1 | Radial Artery |
| . | . |
| . | . |
| . | . |

The process then continues to a step 423 where the present invention calculates additional variables. In this step, for each keyword, the computing device 100 then multiplies the impact factor totals (the figures of TABLE 11) by the frequency total (TABLE 12). An example of these totals are shown in TABLE 13. It is preferred that the values calculated in step 423, TABLE 13, are also stored in a data file on the computer hard drive.

TABLE 13

Impact factor summation × Freguency output

| | |
|---|---|
| 57.386 | Coronary Artery Bypass |
| 57.386 | Polymers |
| 27.368 | Alkanes |
| 1.325 | Coronary Disease |
| 1.325 | Radial Artery |
| . | . |
| . | . |
| . | . |

The calculation of step 423 also involves building a fourth data file which includes an average impact factor for each keyword. Thus, the summed impact factor for each keyword, the value of TABLE 11, is divided by the frequency total (TABLE 12) for the corresponding keyword. The results of this part of the calculation is shown in TABLE 14. As shown in TABLE 11–14, it is preferred that all data file outputs are sorted in a descending order with respect to impact factor or frequency total.

TABLE 14

Impact factor summation/Frequency output

| | |
|---|---|
| 27.368 | Alkanes |
| 14.346 | Coronary Artery Bypass |
| 14.346 | Polymers |
| 1.325 | Coronary Disease |
| 1.325 | Radial Artery |
| . | |
| . | |
| . | |

The examples shown in TABLES 11–14 use small numbers and a limited number of articles for illustrative purposes only. In reality, a search containing thousands of articles from a search on the subject of clinical neurology would look like the example shown in TABLE 15. Thus, to simplify the subsequent calculation steps, the numeral values of the data stored in the data files, TABLE 11–14, may be truncated at the decimal level so each data file stores integer values.

TABLE 15

Impact factor summation output

| | |
|---|---|
| 6,743 | Alzheimer Disease |
| 4,057 | Parkinson Disease |
| 3,468 | Cerebellar Artery |
| 3,078 | Tremor |
| 2,983 | Central Nervous System |
| 2,793 | Reflex |
| 2,702 | Nervous System Neoplasms |
| 2,643 | Meningitis |
| . | . |
| . | . |
| . | . |

Frequency output

| | |
|---|---|
| 2,491 | Alzheimer Disease |
| 1,363 | Parkinson Disease |
| 1,293 | Central Nervous System |
| 1,254 | Nervous System Neoplasms |
| 1,183 | Cerebellar Artery |
| 1,114 | Reflex |
| 1,062 | Meningitis |
| 990 | Tremor |
| . | . |
| . | . |
| . | . |

Impact factor summation × Freguency output

| | |
|---|---|
| 16,796,813 | Alzheimer Disease |
| 5,529,691 | Parkinson Disease |
| 4,102,644 | Cerebellar Artery |
| 3,857,019 | Central Nervous System |
| 3,388,308 | Nervous System Neoplasms |
| 3,111,402 | Reflex |
| 3,047,220 | Tremor |
| 2,806,866 | Meningitis |
| . | . |
| . | . |
| . | . |

Impact factor summation/Freguency output

| | |
|---|---|
| 3.1090 | Tremor |
| 2.9765 | Parkinson Disease |
| 2.9315 | Cerebellar Artery |
| 2.7069 | Alzheimer Disease |
| 2.5071 | Reflex |
| 2.4788 | Meningitis |
| 2.3070 | Central Nervous System |
| 2.1547 | Nervous System Neoplasms |
| . | . |
| . | . |
| . | . |

The impact factor summation output, as illustrated by TABLE 11, is specially designed to address the question of "what is at the forefront of a specialized area." This data is used for this question because it takes into account the addition of the relevance of the journal in which the keywords where published. In addition, the frequency output, as illustrated by TABLE 12, is best suited to determine what is happening in a specialized area. The data of TABLE 12, is used to make this determination since it only takes into account the number of times that a specific keyword was encountered regardless of journals' impact factor. The data of TABLE 13 may be used as an intermediate output between the data shown in TABLE 11 and 12. The data of TABLE 13 may be the preferred output depending on the type of search query. For example, the query may combine all of the database's keywords or the query may combine all of the journals that the database contains.

The data of TABLE 14 reveals the relative importance of each keyword. More specifically, a keyword with a high number would indicate that that keyword is an important keyword, or that it is very "hot," and that researchers investigating this keyword will likely be able to access very high impact factor journals. In contrast, a keyword with a low number would indicate that the keyword generates little interest and is related to a topic that is on the decline. Scientists investigating topics related to these keywords are in danger of not being read, publishing in low impact factor journals, and more importantly, possibly placing themselves in a difficult situation where it is difficult to raise financing for their research activities.

In another embodiment, the process may not tag the keywords with respect to the JCR® impact factors, as shown in steps 413 and 415. On the alternative embodiment, the process may tag keywords with a factor known as the immediacy-index. As provided by ISI, the immediacy-index represents the number of times current articles in a specific journal were cited during the year they were published. ISI publishes ranked lists of journals with respect to immediacy-index values. Thus, in the process of steps 413–423, the immediacy-index values are used in place of the impact factor. TABLE 16 is an example of an ISI publication showing the immediacy-index values with the corresponding journal title.

TABLE 16

| Rank | Journal Title | Immediacy-Index |
|---|---|---|
| 1 | nature genetics | 6.892 |
| 2 | cell | 6.475 |
| 3 | nature | 6.322 |
| 4 | new england journal of medicine | 5.726 |
| 5 | science | 4.722 |
| 6 | annual review of immunology | 4.065 |
| . | . | . |
| . | . | . |
| . | . | . |

In yet another embodiment, the process may use of the cited half-life of the journal, total number of citations, and the cumulative percent of cites to articles published in a set of years. Using the same steps 413–423 described above, these other factors may be substituted in place of the impact factor. As with the impact factor, these alternate factors, such as the cited half-life of the journal, are provided by ISI.

Returning to FIG. 4, the process then continues at a step 425 where the keywords are selected in accordance with the data shown in TABLES 11–14. Here, the computing device, or user, can use any one of the data sets as illustrated by TABLES 11–14 to select the most relevant keywords relating to the topic under investigation.

The procedure of selecting the keywords requires a preliminary explanation to distinguish between specifically related keywords, non-specific related keywords, and non-related keywords. Non-topic keywords do not belong in the subject being investigated. For example the keyword "Foot Dermatoses" has nothing to do with Neurological diseases, therefore, the terms should be discarded. Non-specific keywords are those that belong to the topic in question but are also relevant to other topics. For example, if the topic being investigated is neurological diseases, the keyword "radiography" will be considered as non-specific because although it is used in clinical neurology it is also used in many other medical specialties. Therefore, non-specific keywords should also be discarded. The use of the National Medical Library Thesaurus is an invaluable tool in determining which keywords may be ignored.

Since the number of discovered keywords can be excessive, the process can include a cut-off step. During the selection procedure there may be a point where most of the keywords in the lists are non-specific or non-related keywords. When this occurs, the process should identify the non-specific keywords and stop the selection step 425. The values from the calculation steps 421 and 423 select the specific keywords that relate exclusively to the topic and exclude keywords that are non-topic related and the ones that are non-specific related.

The user should not be concerned by the loss of non-specific keywords. Since there may be three to five focused keywords in every article, it is likely that one or more of the focused keywords will be located in the retrieval process 400. Thus, this article will retrieve a theoretically non-specific word, but in this case since it is attached to specific keywords, the aforementioned non-specific keyword will at the end be a specific-one and not be missed despite the fact that it was never included in the initial query. If a keyword is missed in the search, and is not included in the final query, it is very likely that no loss will occur. The other sets of keywords in the query will retrieve the missing keywords. Thus, it will be counted as if it would had been in the search in the first instance. Therefore, the present invention is flexible in that it does not necessarily require that all keywords to be included. For example, in a hypothetical search to identify articles on the topic of cardiovascular diseases, some of the specific keywords that would had been selected would had included *Coronary Artery Bypass, *Coronary Disease, *Radial Artery among hundreds of them. A non-specific keyword that is dismissed would had been *Polymers, since there are many different polymers and they are used in many different medical specialties. Nonetheless, the selection of any of the three specific keywords would suffice to identify the following article in a search for cardiovasculary diseases. Thus, specific-keywords also retrieve many other non-specific keywords. TABLE 17 is one example of a database query result with the non-specific keyword (polymers).

TABLE 17

<7000>
Source
    Journal of Cardiac Surgery. 13(5):318–27, 1988 Sep-Oct.
MeSH Subject Headings
        Adolescence
        Adult
        Aged
        Aged, 80 and over
        Child
        Child, Preschool
        Comparative Study
        Coronary Angiography
        Coronary Artery Bypass/mo [Mortality]
1.325   *Coronary Artery Bypass/mt [Methods]
        Coronary Disease/ra [Radiography]
1.325   *Coronary Disease/su [Surgery]
        Female
        Follow-Up Studies
        Human
        Infant
        Male
        Middle Age
1.325   *Polymers
        Prospective Studies
1.325   *Radial Artery/tr [Transplantation]
        Survival Rate
        Treatment Outcome In another embodiment, the present invention may identify keywords related to a topic using a keyword tree structure belonging to a bibliographic database. This process is shown in the flow diagram of FIG. 5, another embodiment of a retrieval process 500. This process starts at block 501 where the user of the system identifies a topic's basic sub-questions that need to be addressed. For instance, the user may want to ask the following questions:

What are the most frequently used cells?
What are the most frequently used organs?
Which are the most relevant molecules?
Which are the most relevant biochemical events?

Other examples of the sub-questions are shown below in relation to the indexing process. Once the basic sub-questions have been identified, the user selects the related keywords from the sub-questions. For instance, if the question is, "what are the most frequently used cells," the user selects the word "cells" to use in the following methods.

Next, as shown at a step 503, the user selects the related keywords from a database keyword tree structure by using the keyword selected from the keywords of the sub-question.

As a matter of background, databases contain a keyword tree structure, sometimes referred to as a thesaurus. A keyword tree structure is typically arranged in alphabetical order and/or by subject headings. Subject headings are arranged in a keyword tree structure. For example, the keywords are arranged in three types of subject headings: major, medium and minor. Major headings are keywords that define a subject in a broad manner. Underneath of major headings keyword tree structure, are medium and minor headings. Minor headings are keywords that define a subject in a narrow manner. Medium headings exist between major and minor headings. They define a subject neither too broadly nor too narrowly. For example, the term central nervous system diseases could be considered as a major heading, where as cerebrovascular disorders may be considered as a medium heading and, cerebral embolism and thrombosis may be considered as a minor heading.

The process selects all of the keywords corresponding to a topic's basic subquestions that need to be addressed utilizing the major, medium and minor headings in the database's thesaurus. This can be achieved by either copying all of the keywords or by using an exploding command that many bibliographic databases posses. MEDLINE is a one known bibliographic databases that works well with the methods of the present invention.

The term "exploding" is a term of art used in association with the MEDLINE database. As known by a user of the database, when a term or heading is "exploded," the system selects that term or heading and all of the keywords that are underneath that term or heading in the tree structure. Therefore, a major heading that is specific for the subject can be exploded, or in other words, selected.

In one previous example, one of the sub-questions of interest addresses the top pathological processes relating to clinical neurology. In searching through the keyword tree structure the keywords or term central nervous system diseases may be found. The term central nervous system diseases will contain in a pyramidal structure, otherwise referred to as a tree structure, having many different keywords underneath it. Thus, the terms central nervous system diseases can be exploded.

This step should allow a user to select several hundred keywords belonging to the topic.

Next, the process continues to a step 505where the selection process is repeated for all other sub-questions related to the topic. Step 505 is carried out in a similar manner as the first selection step 503. Thus, the keywords found in the thesaurus that are associated with the remaining sub-questions are selected. In both steps 503 and 505, the selected, or exploded, keywords are stored in a data file on the computer hard drive.

Next, at a step 507 the non-focused keywords are removed. This step is carried out in a manner that is similar to the step 417 of FIG. 4. Next, the process continues to block 509 where the keywords that are found in steps 503–507 are grouped into a database query, where the selected keywords are linked with the "OR" Boolean value.

The process then continues to block 511 where the database query built at a step 509 and is executed to recover a plurality of articles. This step is carried out in a similar manner as the download step 411 of FIG. 4.

Figure 5:
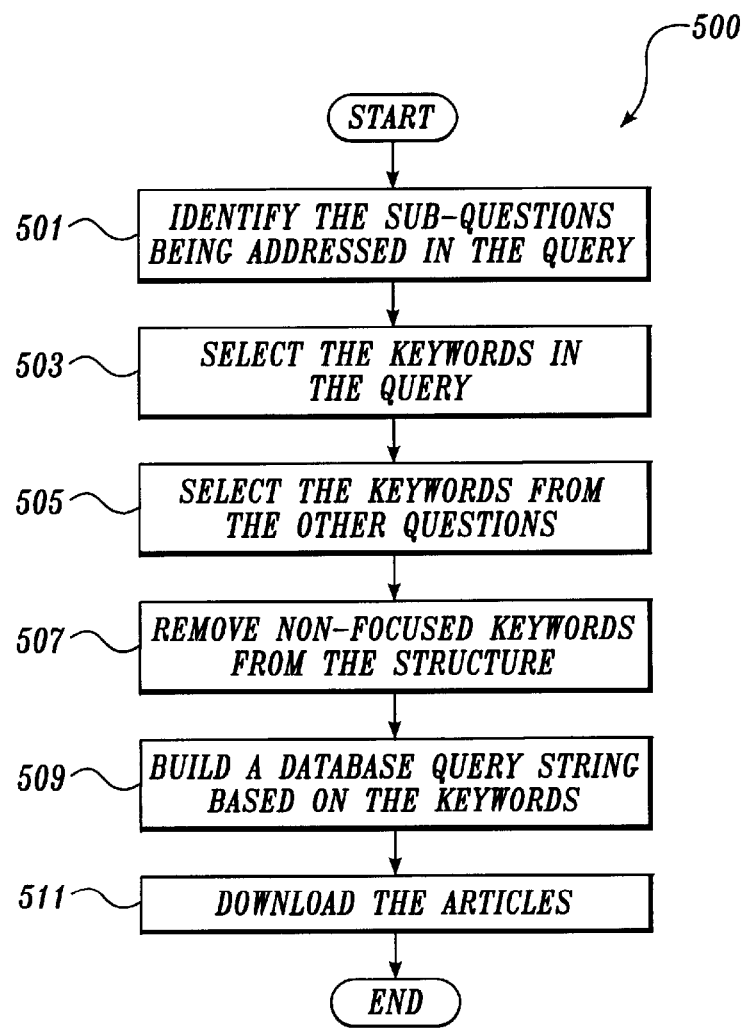
FIG. 5 is a flow diagram depicting another embodiment of the retrieval process of the present invention, wherein the retrieval process utilizes a keyword tree structure.

In yet another embodiment of the invention, the retrieval step (block 301 of FIG. 3) can be carried out in by a method that combines the steps of the embodiment of FIGS. 4 and 5. In this process, the computing device processes the retrieval routines 400 and 500 and then combines all of the database queries obtained at steps 409 and 509. After the two database queries have been combined, the process then eliminates all duplicate keywords so that a final count of selected subject keywords can be determined. This combination of the two routines builds a database query that can be executed in a database program to retrieve a plurality of journals and articles. The articles are then downloaded in a manner that is similar to steps 411 and 511.

The utilization of the retrieval processes, the embodiments of FIGS. 4 and 5 and the combination thereof, allows a user of the system to choose the most important keywords. In the method of FIG. 5, the user will sometimes encounter words at the top of the lists that will be outside of the major branches of the keyword tree structure relating to the investigated subject matter. In this case, knowledge on the subject matter may be helpful. For example, a pre-search on the term diagnostic imaging may identify the term Nuclear Magnetic Resonance as the third most frequently used keyword. Although this keyword lies outside any major keyword tree structure branches relating to Diagnostic Imaging, it is an important keyword relating to the subject. TABLE 18 illustrates an example of a keyword tree structure related to the term, Nuclear Magnetic Resonance.

TABLE 18

Analytical, Diagnostic and Therapeutic Techniques and Equipment
Category
    Investigative Techniques
        Chemistry, Analytical
            Spectrum Analysis
                Nuclear Magnetic Resonance
Physical Sciences Category
    Physical Sciences
        Physics
            Nuclear Physics
                Nuclear Magnetic Resonance Upon completing the list of keywords for the database query, the user may inspect the list to check if the keywords obtained in the final search are adequate. If the user is knowledgeable in the subject, they may be able to identify if the search was successful. Extraneous keywords unrelated to the topic that are found among the top keywords in the final lists should warn the user that a selected keyword will interfere with the final results. At this stage of the process, the extraneous keywords should be removed. Usually, a higher concept in the thesaurus tree structure embraces a desired concept, albeit that some of its minor branches clearly refer to another subject. If both the higher concept and all the minor concepts are used, the final outcome will have a high background noise that will invalidate the search. Elimination of these keywords from the query will provide a more accurate result. Thus, it is important at all times to check if the objective of a clean search is being accomplished. An example of this type of problem can be best explained by the following: Otorhinolaryngology, the medical specialty of ear, nose and throat studies among many of its subjects, neoplasms (cancers). Refer to TABLE 19 for an example of a Head and Neck Neoplasms keyword tree structure. Otorhinolaryngologic Neoplasms are included within the tree structure of Head and Neck Neoplasms. Head and Neck Neoplasms need to be included in the search keyword section because it is a very frequent term being used in Otorhinolaryngologic journals. Besides Otorhinolaryngologic Neoplasms, Esophageal, Facial, Mouth, Thyroid, and Tracheal Neoplasms are also underneath the tree structure of Head and Neck Neoplasms, but they clearly belong to other searches involving Gastroenterology, General Surgery, Maxillo-Facial Surgery, Dermatology, Neurology, Endocrinology and Pulmonology.

TABLE 19

Head and Neck Neoplasms
    Esophageal Neoplasms
    Facial Neoplasms
    Mouth Neoplasms
    Otorhinolaryngologic Neoplasms
        Ear Neoplasms
        Laryngeal Neoplasms
        Nose Neoplasms
            Nasal Polyps
            Paranasal Sinus Neoplasms
                Maxillary Sinus Neoplasms
        Pharyngeal Neoplasms
        Hypopharyngeal Neoplasms
            Nasopharyngeal Neoplasms
            Oropharyngeal Neoplasms
                Tonsillar Neoplasms
    Thyroid Neoplasms
    Tracheal Neoplasms A solution to all these problems is to eliminate these keywords from the final search while maintaining the word Head and Neck Neoplasms together with the tree structure under Otorhinolaryngologic Neoplasms. Thus, the present invention can modify the database query by adding the following keywords to the string: Esophageal Neoplasms, Facial Neoplasms, Mouth Neoplasms, Thyroid Neoplasms, Tracheal Neoplasms. These new terms added to the query will link the terms with an "OR" Boolean value and negated by adding the "NOT" Boolean value to the database query.

As stated above, the pre-search process 400 of FIG. 4 may be beneficial when the user is not familiar with the subject matter of interest. Thus, the pre-search process 400 can be skipped and the embodiment utilizing the thesaurus as illustrated in FIG. 5 can be used alone. If the embodiment utilizing the entire thesaurus is used, the user will be able to understand the broadest question regarding the subject of biomedical feedback. In our example, the database MEDLINE would address the questions "what is happening in biomedical sciences, and what is at the forefront of biomedical sciences." Since the areas that are covered by the database MEDLINE cover the areas of Medicine, Biology, Biochemistry, Molecular Biology, Cell Biology and Pharmacology the aforementioned question can be addressed.

The following is an example of all the MEDLINE keywords:
    1-(5-Isoquinolinesulfonyl)-2-methylpiperazine
    1,2-Dimethylhydrazine
    1,2-Dipalmitoylphosphatidylcholine
    1,4-alpha-Glucan Branching Enzyme
    . . .
    . . .
    Abattoirs Abbreviated Injury Scale
Abbreviations
ABC Transporters
Abdomen
. . .
. . .
Zygosaccharomyces
Zygote
Zygote Intrafallopian Transfer
Zymomonas
Zymosan In yet another embodiment of the retrieval process, the selection of journals can be used instead of the selection of keywords. This process can be used separately from the keyword retrieval methods describe above, or the journal selection process can be combined with the keyword retrieval methods. The embodiments associated with the journal selection process include five different methods. In one embodiment, the journal selection includes a simple method of selecting all of the specialty journals listed in the ISI publications. In another embodiment, the journal selection can include the selection of specialty journals with the highest impact factor. In yet another embodiment, only non-specialty journals can be selected for the retrieval process. In other methods, the selection of non-specialty journals can be combined with the selection of specialty journals. Alternatively, the method can select all of the journals in the database.

These methods use the journal impact factor published by ISI lists. As described above, ISI publishes an extensive list of journals from multiple disciplines in a yearly basis in Journal Citation Reports®. The list of journals are ranked by an impact factor which corresponds to prestige. The impact factor is calculated by dividing the number of citations to articles published in the two previous years by the total number of articles published in that journal during the same two years. TABLE 20 is an example of the journals associated with the term Clinical Neurology listed in a ISI publication from 1997, also listing their corresponding impact factor.

TABLE 20

| Rank | Journal Title | Impact Factor |
|---|---|---|
| 1 | annals of neurology | 9.513 |
| 2 | brain pathology | 5.663 |
| 3 | brain | 5.381 |
| 4 | journal of clinical psychopharmacology | 5.094 |
| 5 | neurology | 4.526 |
| . | . | . |
| . | . | . |
| . | . | . |
| 102 | aktuelle neurologie | 0.240 |
| 103 | nervenheilkunde | 0.226 |
| 104 | psychiatry and clinical neurosciences | 0.191 |
| 105 | neurosurgical review | 0.161 |
| 106 | zhurnal nevropatologii i psikhhiatrii imrni korsakova | 0.128 |

The higher the impact factor that a journal possesses the more prestige it has. It is also likely that the journal also possesses more readership. On the other hand, a journal with a small impact factor will suggest that the quality of its articles is probably average and therefore its readership is small. Journals with a high impact factor cover a widespread series of subjects. In contrast, journals with small impact factor tend to be very focused on a subject. It is a well established phenomenon that scientists/writers gravitate towards publications with the highest impact factors.

Figure 6A:
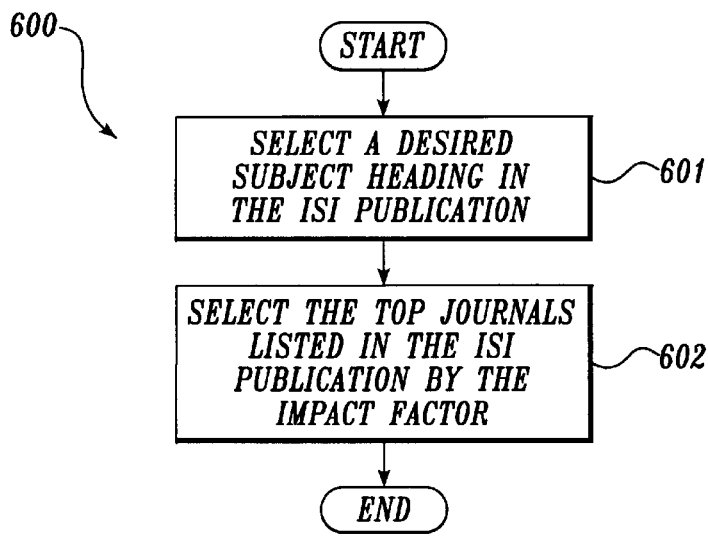
FIG. 6A is a flow diagram depicting another embodiment of the retrieval process of the present invention, wherein the retrieval process utilizes a plurality of specialty journals.

FIG. 6A is a flow diagram depicting one embodiment of the retrieval process of the present invention using the selection of specialty journals found in the ISI publication. The process starts at a step 601 where the user selects a heading under the ISI. Next, at a step 602, the user or computing device selects the top journals that are listed under the selected ISI heading. Thus, in step 602, the journals with the highest impact factor are selected. TABLE 21 illustrates the results of the ranked list (top 10) chosen for the heading of Clinical Neurology in the ISI list published in 1997.

In this embodiment, the method only considers the journal titles under the ISI heading selected by the user. The journal titles under the selected heading are considered to be the specialty journals. Journals titles that are not listed under the ISI heading are considered to be non-specialty journals.

In the illustrative example shown in TABLE 20, the heading of Clinical Neurology is one that could be selected by the user as a topic of choice. All journal titles listed under the heading of *Clinical Neurology* are considered to be "specialty journals," and all other journal listings in the ISI publication are considered to be "non-specialty journals." The example of TABLE 21 is a list of specialty journals sorted by the priority of their corresponding impact factor. The results shown in FIG. 6A are most suitable for a pre-search to find out the most relevant keywords used in the subject under study.

TABLE 21

| | |
|---|---|
| 1 | annals of neurology |
| 2 | brain pathology |
| 3 | brain |
| 4 | journal of clinical psychopharmacology |
| 5 | neurology |
| 6 | stroke |
| 7 | journal of neuropathology & experimental neurology |
| 8 | archives of neurology |
| 9 | schizophrenia bulletin |
| 10 | pain |

Although results shown in FIG. 6A use the top ten journal titles, any numbers of journals can be selected by this ranking. For instance, if an analysis needs more journal titles the present invention can be also modified so that the selection step 602 involves selecting all specialty journals associated with the selected heading, instead of only selecting the top ten.

Figure 6B:
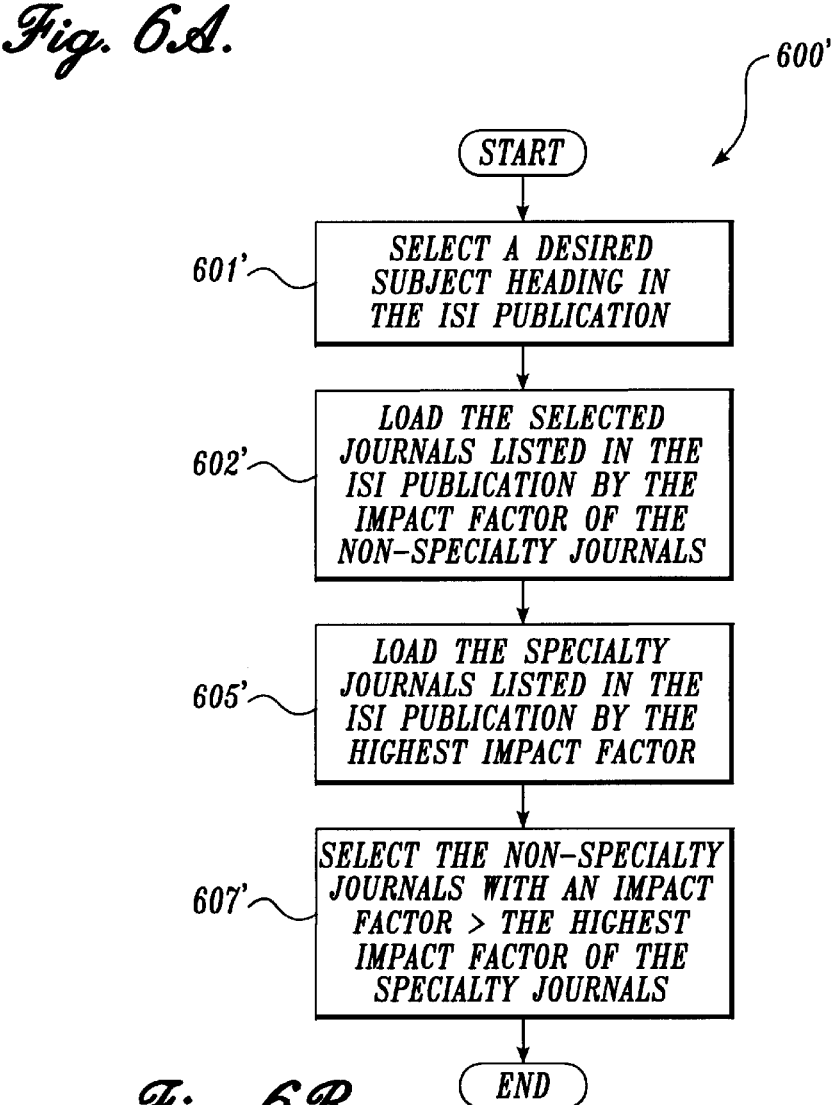
FIG. 6B is a flow diagram depicting yet another embodiment of the retrieval process of FIG. 6A, wherein the process utilizes a non-specialty journals in combination with the specialty journals.

In another embodiment, the journal selection process may include the selection of non-specialty journals. In this embodiment, non-specialty journals with an impact factor higher than the specialty journal with the highest impact factor are selected. FIG. 6B illustrates the selection process using the non-specialty journals 600'. This follows the reasoning that most if not all of the major advances in a field are not published in the journal's field but in journals with the highest impact factor the present selection of journals addresses the phenomenon by which scientists gravitate towards publishing in the most prestigious journals.

The process starts at a step 601' where the user or the computing device selects a heading under the ISI. The step 601' is carried out in the same manner as the step 601 in FIG. 6A. The process then continues at a step 602' where the computing device loads the titles of the non-specialty journal with the highest impact factors. TABLE 22 is an example of a list of non-specialty journals under the heading of Science in the ISI list. Although, the heading of Science is used in this example, other generic headings can be used to collect the title names of non-specialty journals.

The process then continues to a step 605' where the computing device loads a list of specialty journal titles. The step 605' is carried out in the same manner as step 602 of FIG. 6A.

The process then continues at a step 607' where the selection step takes place. In this embodiment, only the non-specialty journals with an impact factor greater than the first related specialty journal are selected. In the example of the heading of Clinical Neurology and according to the list previously shown, the process should select all the journals with a higher impact factor than the journal titled *Annals of Neurology*. TABLE 22 is a list of the top non-specialty journals in the Science ISI list. Using the method of step 607', all of the non-specialty journals shown in TABLE 22 would be selected because they have an impact factor higher than the highest specialty journal, *The Annals of Neurology*, which has an impact factor of 9.513.

TABLE 22

| Rank | Journal Title | Impact Factor |
| --- | --- | --- |
| 1 | annual review of biochemistry | 40.782 |
| 2 | nature genetics | 38.854 |
| 3 | annual review of immunology | 37.796 |
| 4 | cell | 37.297 |
| 5 | nature medicine | 28.114 |
| 6 | New England journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| . | . | . |
| . | . | . |

In the embodiment of FIG. 6B, the method utilizing the impact factor of non-specialty journals, is most suitable to analyze the question of what is at the forefront of a research topic?

In yet another embodiment, the present invention combines the two different embodiments illustrated in FIGS. 6A–6B. In this embodiment, the method of selecting the specialty journals with the highest impact factor is combined with the method utilizing the non-specialty journals with an impact factor higher than the specialty journal with the highest impact factor. Thus, steps 602 and 602' are both processed to find a list of relevant journals.

In some instances, the number of non-specialty journals is rather small. For instance if there are one hundred publications per year, a statistical and trends analysis will be difficult to accurately evaluate. If this occurs, the user should increase the number of publications used in the analysis. In such a case, the user might want to add titles of the top specialty journals to the list of non-specialty journals. In the example involving the heading of Clinical Neurology, and the specialty journal of *Annals of Neurology*, the journal list would appear as:

TABLE 23

| Rank | Journal Title | Impact Factor |
| --- | --- | --- |
| 1 | annual review of biochemistry | 40.782 |
| 2 | nature genetics | 38.854 |
| 3 | annual review of immunology | 37.796 |
| 4 | cell | 37.297 |
| 5 | nature medicine | 28.114 |

TABLE 23-continued

| Rank | Journal Title | Impact Factor |
| --- | --- | --- |
| 6 | New England journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| n | annals of neurology | 9.513 |
| n | brain pathology | 5.663 |
| . | . | . |
| . | . | . |

In addition, the method can include a second specialty journal or a third, if the number of publications remains small. In this example, the *Journal of Brain Pathology* would be added to the journal selection list. If needed, the user or computer program can repeat the same procedure until the system finds that the number of publications/year is acceptable for statistical analysis. An acceptable number of publications for statistical analysis occurs when three hundred or more publications per year are obtained. TABLE 24 is one example of a list adding the specialty journal titles.

TABLE 24

| Rank | Journal Title | Impact Factor |
| --- | --- | --- |
| 1 | annual review of biochemistry | 40.782 |
| 2 | nature genetics | 38.854 |
| 3 | annual review of immunology | 37.796 |
| 4 | cell | 37.297 |
| 5 | nature medicine | 28.114 |
| 6 | new england journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| n | annals of neurology | 9.513 |
| n + 1 | brain pathology | 5.663 |
| . | . | . |
| . | . | . |

In yet another embodiment, the system and method described above is modified to use additional non-specialty journal titles in the search. Thus, the step 607' of FIG. 6B could be modified to select all non-specialty journals with an impact factor higher than the second or third highest impact factor of the specialty journals. Again, this will allow the process to increase the number of journal titles if the process does not produce enough articles as the process is described in step 607' of FIG. 6B. TABLE 25 is one example of a journal selection list using this embodiment. This embodiment is more suitable to find answer the question of what is at the forefront of a research topic?

TABLE 25

| Rank | Journal Title | Impact Factor |
| --- | --- | --- |
| 1 | annual review of biochemistry | 40.782 |
| 2 | nature genetics | 38.854 |
| 3 | annual review of immunology | 37.796 |
| 4 | cell | 37.297 |

TABLE 25-continued

| Rank | Journal Title | Impact Factor |
|---|---|---|
| 5 | nature medicine | 28.114 |
| 6 | new england journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| . | . | . |
| . | . | . |
| n | annals of neurology | 9.513 |
| . | . | . |
| . | . | . |
| . | . | . |
| m | brain pathology | 5.663 |
| . | . | . |
| . | . | . |
| . | . | . |

In yet another embodiment, the process of selecting journals can involve selecting the specialty journals together with the non-specialty journals with an impact factor higher than the best specialty journal with the highest impact factor. This is a combination of the methods of FIGS. 6A and 6B. This embodiment is most suitable to find out what is at the forefront of a research topic?

TABLE 26

| Rank | Journal Title | Impact Factor |
|---|---|---|
| 1 | annual review of biochemistry | 40.782 |
| 2 | nature genetics | 38.854 |
| 3 | annual review of immunology | 37.796 |
| 4 | cell | 37.297 |
| 5 | nature medicine | 28.114 |
| 6 | new england journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| . | . | . |
| . | . | . |
| n | annals of neurology | 9.513 |
| n + 1 | brain pathology | 5.663 |
| n + 2 | brain | 5.381 |
| n + 3 | journal of clinical psychopharmacology | 5.094 |
| n + 4 | neurology | 4.526 |
| n + 5 | stroke | 4.323 |
| n + 6 | journal of neuropathology & exper. neurology | 4.253 |
| n + 7 | archives of neurology | 3.779 |
| n + 8 | schizophrenia bulletin | 3.509 |
| n + 9 | pain | 3.318 |
| . | . | . |
| . | . | . |
| . | . | . |
| m | aktuelle neurologie | 0.240 |
| m + 1 | nervenheilkunde | 0.226 |
| m + 2 | psychiatry and clinical neurosciences | 0.191 |
| m + 3 | neurosurgical review | 0.161 |
| m + 4 | zhurnal nevropatologii i psikhhiatrii imrni korsav. | 0.128 |

In yet another embodiment, the selection process can be as simple as selecting all of the journals in the database. This process produces the most journal articles and just involves, selecting all journal titles by entering an unrestricted database query.

This embodiment is most suitable to find out the question of what is happening in a topic of interest? It could also be used to address the question of what is at the forefront of that topic? If the computing device has an appropriate memory allocation, this embodiment can be used to address broad questions regarding biomedical research.

TABLE 27

| Rank | Journal Title | Impact Factor |
|---|---|---|
| 1 | annual review of biochemistry | 40.782 |
| 2 | nature genetics | 38.854 |
| 3 | annual review of immunology | 37.796 |
| 4 | cell | 37.297 |
| 5 | nature medicine | 28.114 |
| 6 | new england journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| . | . | . |
| . | . | . |
| n | revista de biologia tropical | 0.132 |
| . | . | . |
| . | . | . |
| . | . | . |

Figure 7:
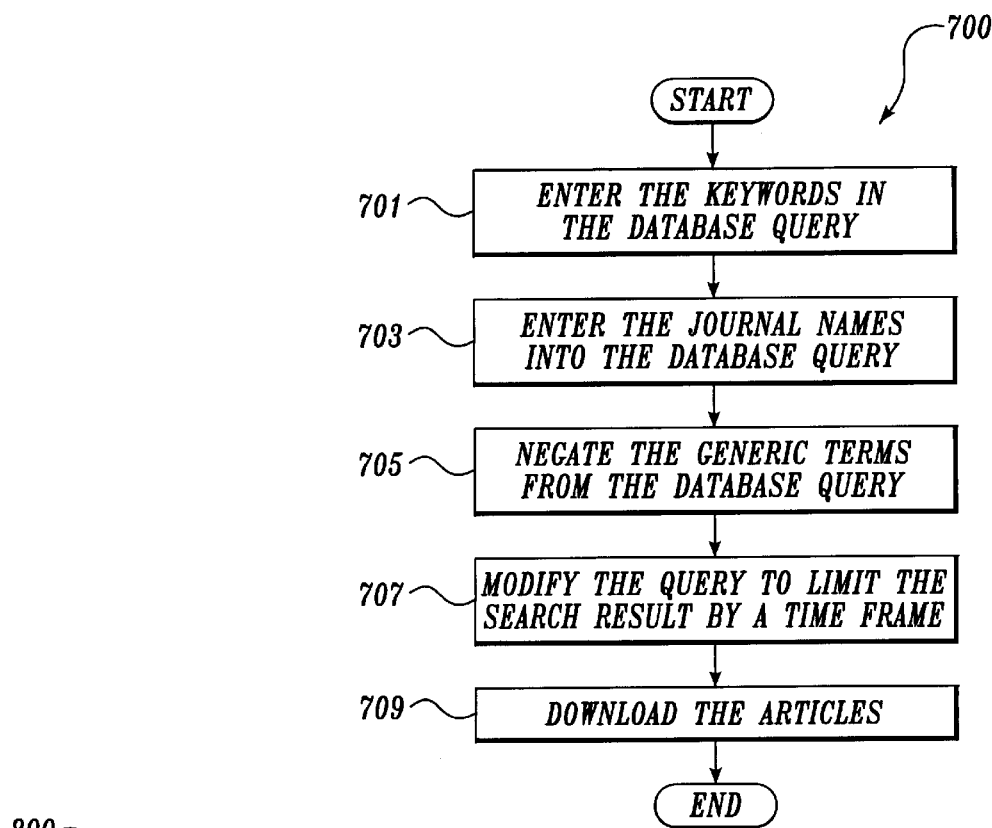
FIG. 7 is a flow diagram depicting yet another embodiment of the retrieval process, wherein the retrieval process utilizes keywords of a pre-search and specialty and non-specialty journals.

As mentioned above, the embodiments of the retrieving step (step 301 of FIG. 3), involving both the keyword pre-search and the journal selection search, can be combined. Thus, in yet another embodiment, a method can combine the various retrieval methods described above to build a list of keywords and journal titles. FIG. 7 is a flow diagram showing this combination retrieval process 700. Thus, once the keywords for the specific search have been gathered and a selection of a set of journals to best address one of the two questions has been established the user is ready to proceed with the first step 701 where the keywords are entered into the database query.

The following example involves a user selection of the topic of clinical neurology. Following a pre-search using the systems described above, a list of nine hundred keywords that are considered specific for the subject under study are selected. TABLE 28 is an example of these keywords.

TABLE 28

Abducens Nerve
Accessory Nerve
Acoustic Nerve
Acoustic Nerve Diseases
Acrodynia
Action Potentials
Adie's Syndrome
.
.
.
Waterhouse-Friderichsen Syndrome
Werdnig-Hoffmann Disease
Wernicke's Encephalopathy
West Nile Fever
Williams Syndrome
Zellweger Syndrome In some cases the user might want to avoid obtaining secondary articles that might obscure the final interpretation of the data. As explained above, two kinds of keywords exist in some databases: focused and non-focused. By selectively choosing focused keywords, the user is making sure that all the articles that will finally be downloaded will be the ones in which the user is really interested. In the MEDLINE database application, in order to do that, the user needs to input an asterisk in front of the keywords requested and a backwards stroke /. TABLE 29 is an example of this query. in the step 701, the keywords are entered into the database query linked by the "or" Boolean value.

TABLE 29

*Abducens Nerve/
*Accessory Nerve/
*Acoustic Nerve/
*Acoustic Nerve Diseases/
*Acrodynia/
*Action Potentials/
*Adie's Syndrome/
.
.
.
*Waterhouse-Friderichsen Syndrome/
*Werdnig-Hoffmann Disease/
*Wernicke's Encephalopathy/
*West Nile Fever/
*Williams Syndrome/
*Zellweger Syndrome/

In some instances the user might be interested in using subheadings to address a more refined search. For instance the user might want to know more about the origins of these diseases and their physiological and pathological events associated with them. To accomplish this purpose, the user might be interested in abnormalities, anatomy and histology, cerebrospinal fluid, congenital, embryology, etiology, genetics, innervation, metabolism, pathology, physiology, physiopathology of all the keywords selected regarding Clinical Neurology rather than searching all the keywords related to the subject. The user would place a backwards stroke / at the end of all the keywords selected and the two letter code of the subheadings chosen by the user. According to the MEDLINE application, the following are the two letter codes for the subheadings previously mentioned:

| | |
|---|---|
| ab | abnormalities |
| ah | anatomy and histology |
| cf | cerebrospinal fluid |
| cn | congenital |
| em | embryology |
| et | etiology |
| ge | genetics |
| ir | innervation |
| me | metabolism |
| pa | pathology |
| ph | physiology |
| pp | physiopathology |

Therefore, the keywords exposed above would look like the following:

*Abducens Nerve/ab, ah, cf, cn, em, et, ge, ir, me, pa, ph, pp
*Accessory Nerve/ab, ah, cf, cn, em, et,ge, ir, me, pa, ph, pp
*Acoustic Nerve/ab, ah, cf, cn, em, et, ge, ir, me, pa, ph, pp
*Acoustic Nerve Diseases/ab, ah, cf, cn, em, et, ge, ir, me, pa, ph, pp
*Acrodyinia/ab, ah, cf, cn, em, et, ge, ir, me, pa, ph, pp
*Action Potentials/ab, ah, cf, cn, em, et, ge, ir, me, pa, ph, pp
*Adie's Syndrome/ab, ah, cf, cn, em, et, ge, ir, me, pa, ph, pp
* . . .
* . . .
*Waterhouse-Friderichsen Syndrome/ab, ah, cf, cn, em, et, ge, ir, me, pa, ph, pp
Werdnig-Hoffmann Disease/ab, ah, cf, cn, em, et, ge, ir, me, pa, ph, pp
*Wernicke's Encephalopathy/ab, ah, cf, cn, em, et, ge, ir, me, pa, ph, pp
*West Nile Fever/ab, ah, cf, cn, em, et, ge, ir, me, pa, ph, pp
*Williams Syndrome/ab, ah, cf, cn, em, et, ge, ir, me, pa, ph, pp
*Zellweger Syndrome/ab, ah, cf, cn, em, et, ge, ir, me, pa, ph, pp Referring again to FIG. 7, the process continues to a step 703 where a set of journals are entered into the database query. For example, if a user has decided to use the method of FIG. 6B to select the journals for the query, all the specialty journals together with the non-specialty journals with an impact factor higher than the best specialty journal with the highest impact factor, TABLE 30 would represent an example of a list of journals involved. In step 703, the journal titles are entered into the database query linked by the "OR" Boolean value.

TABLE 30

| Rank | Journal Title | Impact Factor |
|---|---|---|
| 1 | annual review of biochemistry | 40.782 |
| 2 | nature genetics | 38.854 |
| 3 | annual review of immunology | 37.796 |
| 4 | cell | 37.297 |
| 5 | nature medicine | 28.114 |
| 6 | new england journal of medicine | 27.766 |
| 7 | nature | 27.368 |
| 8 | science | 24.676 |
| 9 | endocrinology reviews | 23.017 |
| 10 | annual review of neurosciences | 21.952 |
| . | . | . |
| . | . | . |
| . | . | . |
| n | annals of neurology | 9.513 |
| n + 1 | brain pathology | 5.663 |
| n + 2 | brain | 5.381 |
| n + 3 | journal of clinical psychopharmacology | 5.094 |
| n + 4 | neurology | 4.526 |
| n + 5 | stroke | 4.323 |
| n + 6 | journal of neuropathology & exper. neurology | 4.253 |
| n + 7 | archives of neurology | 3.779 |
| n + 8 | schizophrenia bulletin | 3.509 |
| n + 9 | pain | 3.318 |
| . | . | . |
| . | . | . |
| . | . | . |

The process then continues to step 705 where the non-original scientific publications are filtered. As described above, this process filters out the general editorials and news articles. Thus, the keywords of TABLE 31 can be entered in the database query.

TABLE 31 editorial
news
letters
comments
news
clinical conference
interviews
reviews
discussions
anonymous In step 705, the filter terms are linked by the "OR" Boolean value and negated by the "NOT" Boolean value, as described above.

Next, as shown in step 707, the query is further limited by years or group of years so that statistical trends can be studied. If the query is searching for articles between 1990 and 1998 the query will use the limits in the database query. An example of this limitation is shown in TABLE 32.

TABLE 32 limit to yr = 1998
limit to yr = 1997
limit to yr = 1996
limit to yr = 1995
limit to yr = 1994
limit to yr = 1993
limit to yr = 1992
limit to yr = 1991
limit to yr = 1990

Next, the process proceeds to block 709 where the articles are downloaded. This step is carried out in the same manner as the download step 411 of FIG. 4.

An alternative method to use this system is to process two different combinations of keywords and journals. One combination would combine all nine hundred keywords for the term Clinical Neurology and all the non-specialty journals with an impact factor higher than the best specialty journal with the highest impact factor. The second combination would combine all the specialty journals with no keywords. The latter would obtain all the articles published in those journals. Since these journals are directly related to the area under investigation there is no need to contrast them against the selected keywords. Thus, the search becomes more refined and accurate, and most probably will contain a few more articles that otherwise would had been missed. Further steps of removing non-related scientific publications and limiting the query to years prior to downloading are necessary.

Indexing: Arrangement of the data prior to indexing

Figure 8:
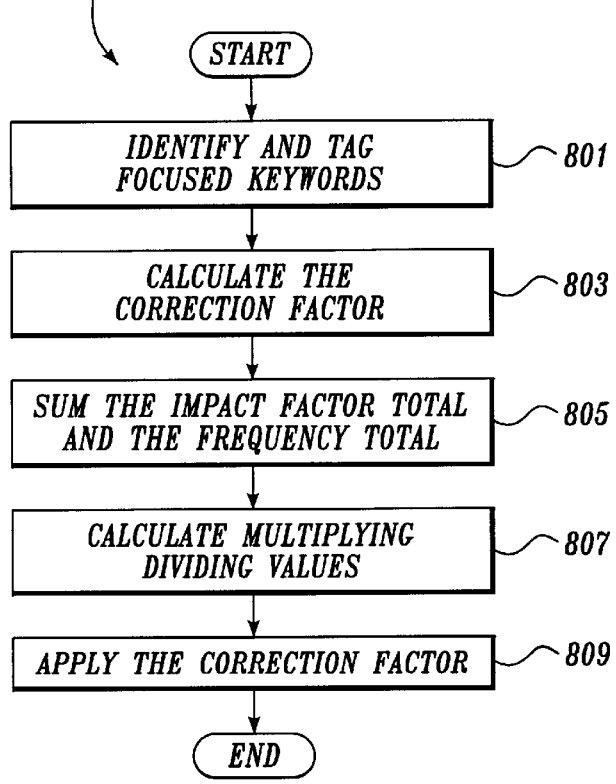
FIG. 8 is a flow diagram depicting one embodiment of the index arrangement process, where the index arrangement process provides a correction factor.

Now referring again to FIG. 3, the indexing step 303 is described in more detail. In one embodiment of the indexing step 303, the process must arrange the data prior to indexing. An arrangement process 800 is depicted in the flow diagram of FIG. 8. The process starts at a step 801 where the process identifies the nonfocused keywords.

As described above, there are two kinds of keywords. One type of keyword represents the gist of the article and are tagged with an asterisk. These are focused keywords. The second type of keyword represents secondary or collateral issues. These are known as the non-focused keywords.

Upon opening with a word processor of a downloaded set with, for example, seven thousand articles, the user will be confronted with file similar to TABLE 33.

TABLE 33

<1>
Source
   New England Journal of Medicine. 338(26): 1888–95, 1998 Jun 25.
MeSH Subject Headings
   Acetylcholine
   Calcium/ph [Physiology]
   *Epilepsy
   *Epilepsy/dt [Drug Therapy]
   Nerve Tissue Proteins/me [Metabolism]
   .
   .
   .
   *Vision
.
.
.
<7000>
Source
   Nature Medicine. 4(11): 1269–75, 1998 Nov.
MeSH Subject Headings TABLE 33-continued Brain
*Brain
*Brain/im [Immunology]
*Cerebral Hemorrhage/co [Complications]
.
.
.
Vitamin A/bi [Biosynthesis]

Since the question to be addressed requires a clear cut answer, it is best to remove non-focused keywords that could jeopardize the answer being sought. Knowing that non-focused keywords are the vast majority of the keywords in each article, it is likely that if taken into the statistical analysis they may obscure the important issues to be determined. Therefore, non-focused words should be removed. Given that focused versus non-focused keywords differ by the tagged * a letter like X can be tagged to all words containing an *, thus all keywords with * will look like *X. TABLE 34 is an example of this process.

TABLE 34

<1>
Source
   New England Journal of Medicine. 338(26): 1888–95, 1998 Jun 25.
MeSH Subject Headings
   Acetylcholine
   Calcium/ph [Physiology]
   *XEpilepsy
   *XEpilepsy/dt [Drug Therapy]
   Nerve Tissue Proteins/me [Metabolism]
   .
   .
   .
   *XVision
.
.
.
<7000>
Source
   Nature Medicine. 4(11): 1269–75, 1998 Nov.
MeSH Subject Headings
   Brain
   *XBrain
   *XBrain/im [Immunology]
   *XCerebral Hemorrhage/co [Complications]
   .
   .
   .
   Vitamin A/bi [Biosynthesis]

Next, in a step 803, the process calculates a correction factor. This step is carried out by recording how many changes were made by tagging the focused keywords with an X. This will indicate the user the total number of focused keywords per year or group of years. For instance if a search has been downloaded by years the list showing the number of focused keywords might be like the following:

TABLE 35

| 1998 | 85,345 | focused keywords |
|------|--------|------------------|
| 1997 | 83,759 | " |
| 1996 | 82,874 | " |
| 1995 | 80,996 | " |
| 1994 | 77,721 | " |
| 1993 | 73,858 | " |
| 1992 | 68,493 | " |
| 1991 | 64,832 | " |
| 1990 | 57,732 | " |

Since the number of keywords might vary from different years due to the fact that some journals increase with time the number of articles they carry, some journals are new or some journals change their names, a correction factor needs to be determined. This correction factor will compare every year or group of years in an equal manner. If all the conditions remain equal, any keyword that is on the rise will be able to displace other ones. In such a case, a true comparative analysis between different years will be made possible. Consequently, the correction factor is preferably determined by taking the year or group of years with the highest number of focused keywords that had been tagged with *X and divide it by each one of the other years or group of years. Each year will have a correction factor. The following represent the example years, with their correspondent correction factor. Following this procedure, the letter X can be removed since it will be no longer needed.

Alternatively, rather than counting the focused keywords, the process can count the number of articles obtained.

TABLE 36

| 1998 | 1.00 | Correction Factor |
|------|------|-------------------|
| 1997 | 1.02 | " |
| 1996 | 1.03 | " |
| 1995 | 1.05 | " |
| 1994 | 1.10 | " |
| 1993 | 1.16 | " |
| 1992 | 1.25 | " |
| 1991 | 1.32 | " |
| 1990 | 1.48 | " |

The process then continues to a step 805 where the process calculates the sum of the impact factor and the frequency total. This summation step 805 is carried out in the same manner as the summation step 421 of FIG. 4. Next, the process continues to a step 807 where the process calculates the multiplying factors. This calculation step 807 is carried out in the same manner as the calculation step 423 of FIG. 4. As also shown above, TABLE 37 is an example of the results of the calculation steps 805 and 807.

TABLE 37

| Impact factor summation output | |
|---|---|
| 6,743 | Alzheimer Disease |
| 4,057 | Parkinson Disease |
| 3,468 | Cerebellar Artery |
| 3,078 | Tremor |
| 2,983 | Central Nervous System |
| 2,793 | Reflex |
| 2,702 | Nervous System Neoplasms |
| 2,643 | Meningitis |
| . | . |
| . | . |

| Freguency output | |
|---|---|
| 2,491 | Alzheimer Disease |
| 1,363 | Parkinson Disease |
| 1,293 | Central Nervous System |
| 1,254 | Nervous System Neoplasms |
| 1,183 | Cerebellar Artery |
| 1,114 | Reflex |
| 1,062 | Meningitis |
| 990 | Tremor |
| . | . |
| . | . |

| Impact factor summation × Frequency output | |
|---|---|
| 16,796,813 | Alzheimer Disease |
| 5,529,691 | Parkinson Disease |
| 4,102,644 | Cerebellar Artery |
| 3,857,019 | Central Nervous System |

TABLE 37-continued

| 3,388,308 | Nervous System Neoplasms |
|---|---|
| 3,111,402 | Reflex |
| 3,047,220 | Tremor |
| 2,806,866 | Meningitis |
| . | . |
| . | . |

| Impact factor summation/Frequency output | |
|---|---|
| 3.1090 | Tremor |
| 2.9765 | Parkinson Disease |
| 2.9315 | Cerebwellar Artery |
| 2.7069 | Alzheimer Disease |
| 2.5071 | Reflex |
| 2.4788 | Meningitis |
| 2.3070 | Central Nervous System |
| 2.1547 | Nervous System Neoplasms |
| . | . |
| . | . |

| Frequency output | |
|---|---|
| 2,491 | Alzheimer Disease |
| 1,363 | Parkinson Disease |
| 1,293 | Central Nervous System |
| 1,254 | Nervous System Neoplasms |
| 1,183 | Cerebellar Artery |
| 1,114 | Reflex |
| 1,062 | Meningitis |
| 990 | Tremor |
| ... | ... |
| ... | ... |

| Impact factor summation × Frequency output | |
|---|---|
| 16,796,813 | Alzheimer Disease |
| 5,529,691 | Parkinson Disease |
| 4,102,644 | Cerebellar Artery |
| 3,857,019 | Central Nervous System |
| 3,388,308 | Nervous System Neoplasms |
| 3,111,402 | Reflex |
| 3,047,220 | Tremor |
| 2,806,866 | Meningitis |
| ... | ... |
| ... | ... |

| Impact factor summation/Frequency output | |
|---|---|
| 3.1090 | Tremor |
| 2.9765 | Parkinson Disease |
| 2.9315 | Cerebellar Artery |
| 2.7069 | Alzheimer Disease |
| 2.5071 | Reflex |
| 2.4788 | Meningitis |
| 2.3070 | Central Nervous System |
| 2.1547 | Nervous System Neoplasms |
| ... | ... |
| ... | ... |

In order to be able to compare every year or groups of years on an equal basis a correction factor needs to be applied. This step is depicted at a step 809 of FIG. 8. In the following example of the application of the correction factor, the year being studied is 1994. To the keywords found in the 1994 search, a correction factor of 1.10 needs to be applied. After the correction factor has been applied to the data of TABLE 36, the outputs will look like the output shown in TABLE 38.

TABLE 38

Impact factor summation output

| | |
|---|---|
| 7,417 | Alzheimer Disease |
| 4,462 | Parkinson Disease |
| 3,814 | Cerebellar Artery |
| 3,385 | Tremor |
| 3,281 | Central Nervous System |
| 3,072 | Reflex |
| 2,972 | Nervous System Neoplasms |
| 2,907 | Meningitis |
| . | . |
| . | . |
| . | . |

Frequency output

| | |
|---|---|
| 2,740 | Alzheimer Disease |
| 1,499 | Parkinson Disease |
| 1,422 | Central Nervous System |
| 1,379 | Nervous System Neoplasms |
| 1,301 | Cerebellar Artery |
| 1,225 | Reflex |
| 1,168 | Meningitis |
| 1,089 | Tremor |
| . | . |
| . | . |
| . | . |

Impact factor summation x Frequency output

| | |
|---|---|
| 20,322,580 | Alzheimer Disease |
| 6,688,538 | Parkinson Disease |
| 4,962,014 | Cerebellar Artery |
| 4,665,582 | Central Nervous System |
| 4,098,388 | Nervous System Neoplasms |
| 3,763,200 | Reflex |
| 3,686,265 | Tremor |
| 3,395,376 | Meningitis |
| . | . |
| . | . |
| . | . |

Impact factor summation/Frequency output

| | |
|---|---|
| 3.1083 | Tremor |
| 2.9766 | Parkinson Disease |
| 2.9315 | Cerebellar Artery |
| 2.7069 | Alzheimer Disease |
| 2.5077 | Reflex |
| 2.4888 | Meningitis |
| 2.3073 | Central Nervous System |
| 2.1555 | Nervous System Neoplasms |
| . | . |
| . | . |
| . | . |

Indexing

The aim of this system is to gather the information necessary to address the question of "what is happening in a specialized area?" and, what are the topics-items that are getting "hot" as well as the ones that are "cooling down?" As a consequence, the following are some of the sub-questions that can be addressed:

What are the most frequently used cells?
What are the most frequently used organs?
Which are the most relevant molecules?
Which are the most relevant biochemical events?
Which are the most relevant genetic events?
Which are the most relevant physiological events?
Which are the top pathological processes?
Which are the most relevant diagnostic techniques?
Which are the most attractive therapeutic approaches?
Which are the most relevant pharmacological compounds?

. . .
. . .

Figure 9:
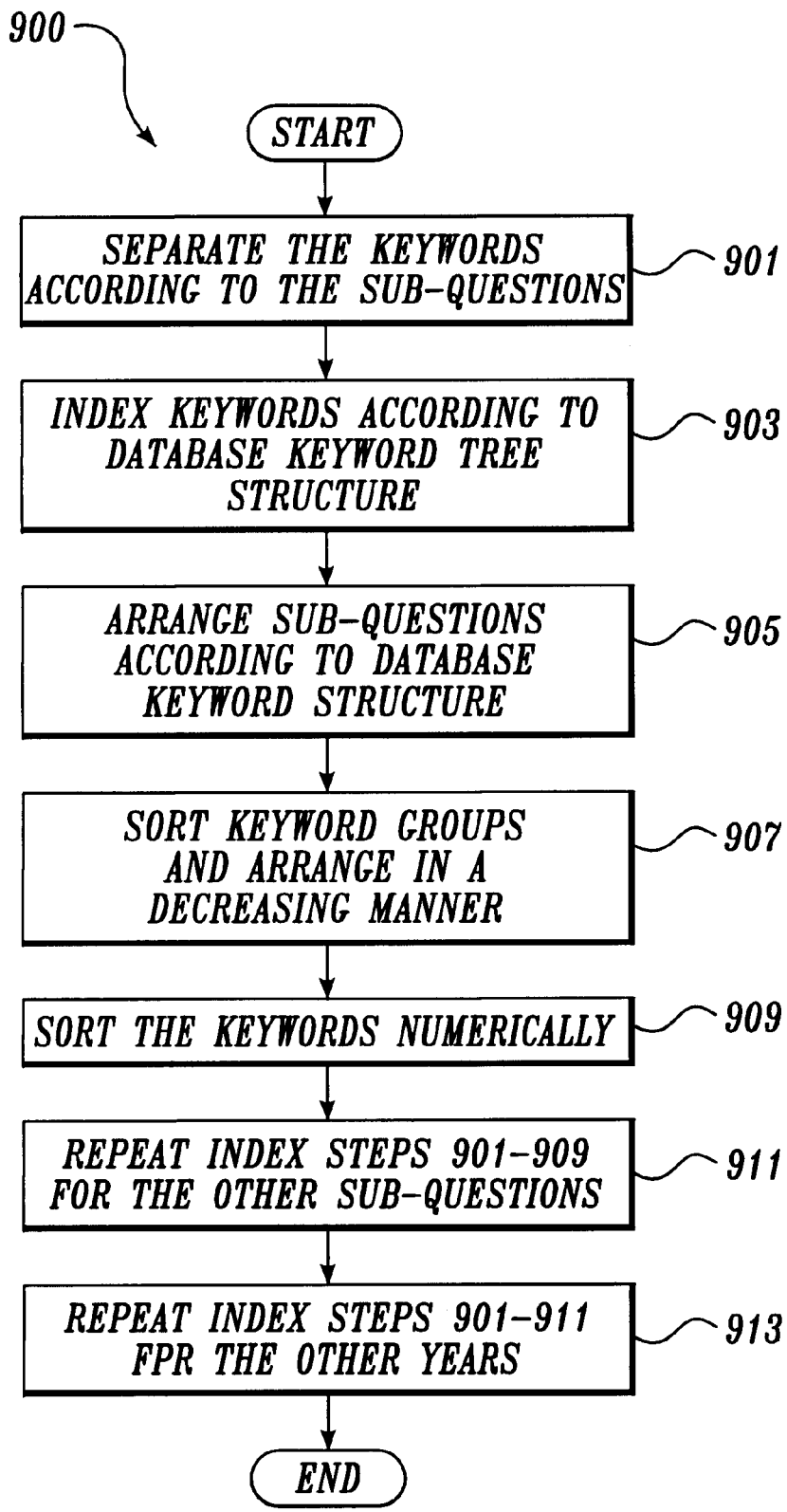
FIG. 9 is a flow diagram depicting one embodiment of the index process of the present invention.
Figure 10A:
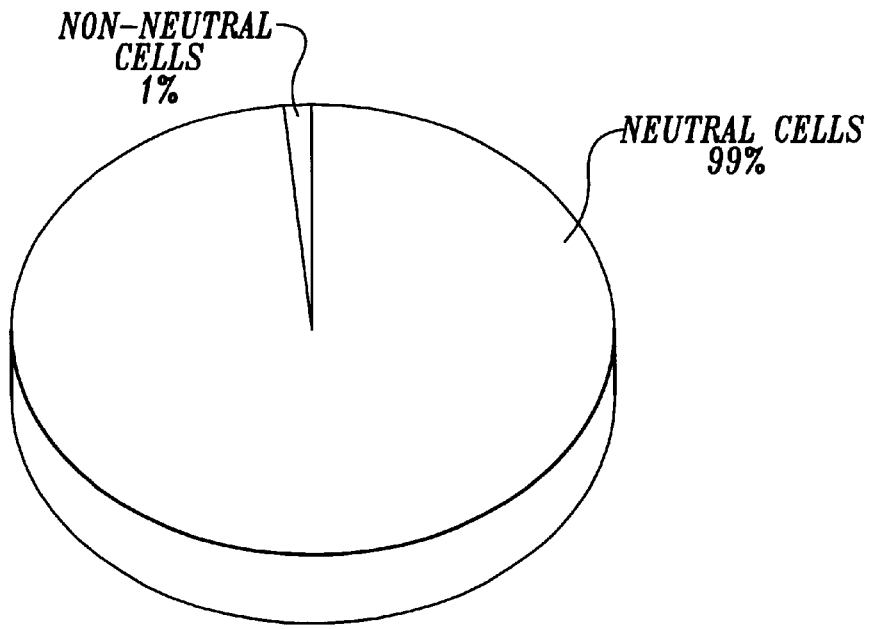
FIGS. 10A–10F are data charts generated from the data formatted in the index process.
Figure 10B:
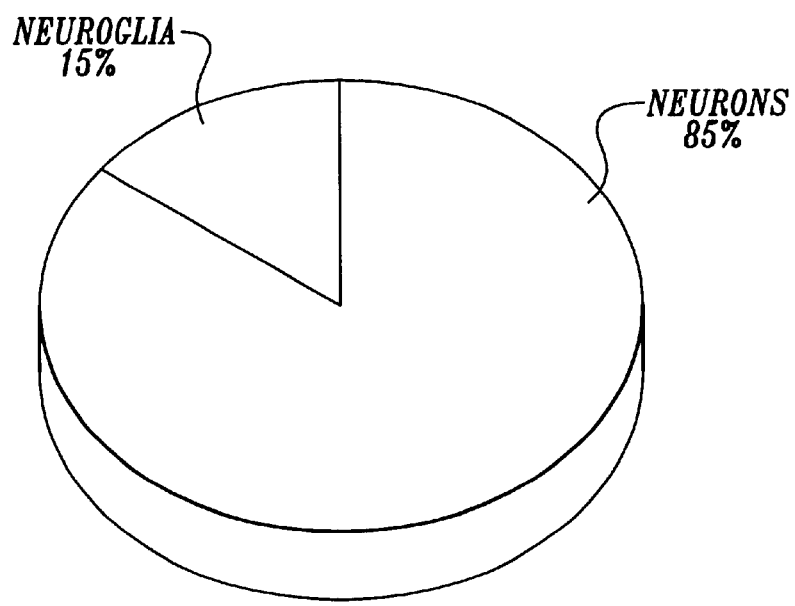
Figure 10C:
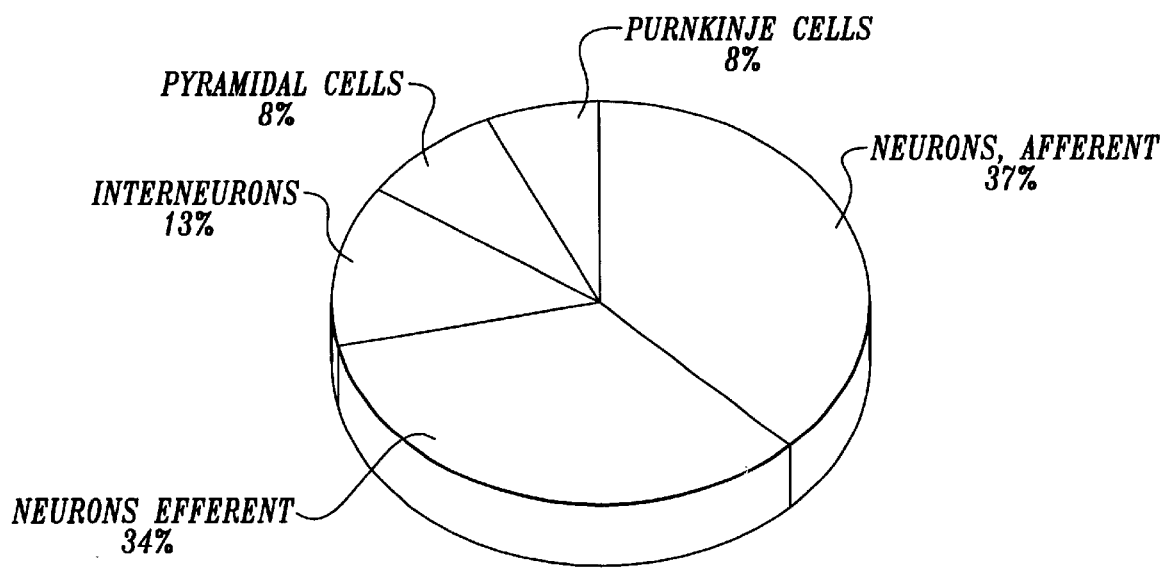
Figure 10D:
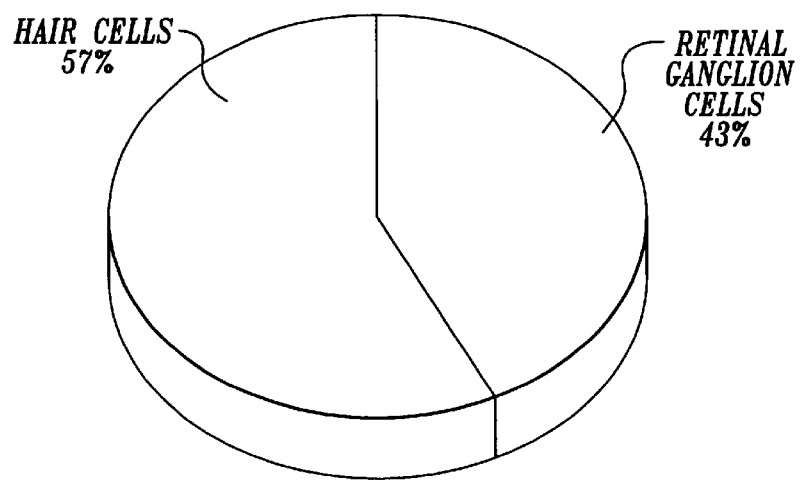
Figure 10E:
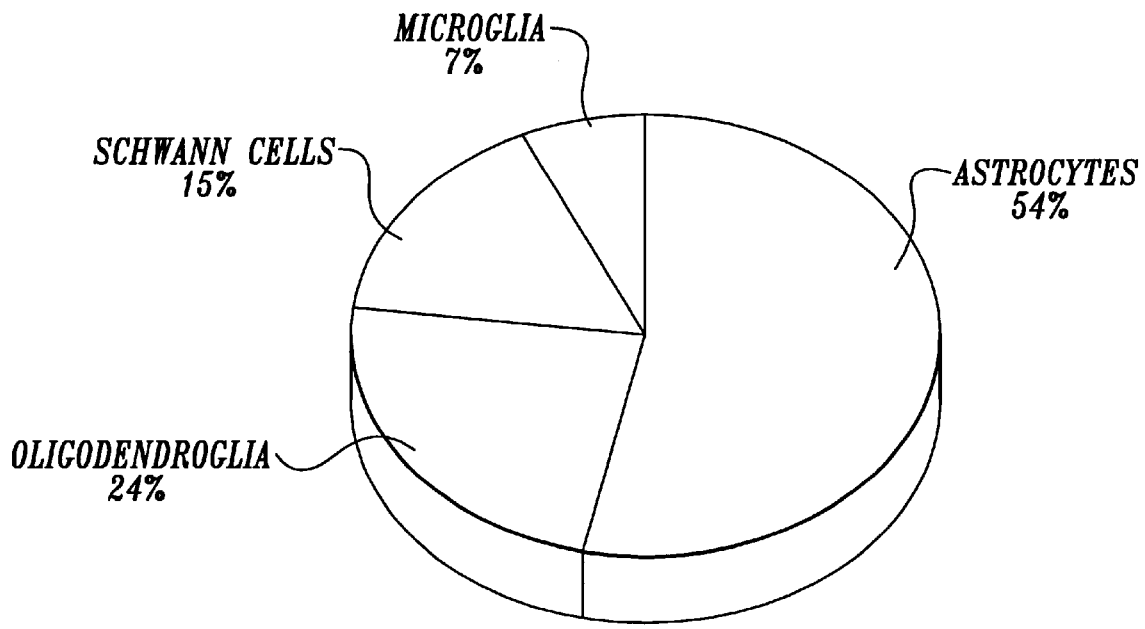
Figure 10F:
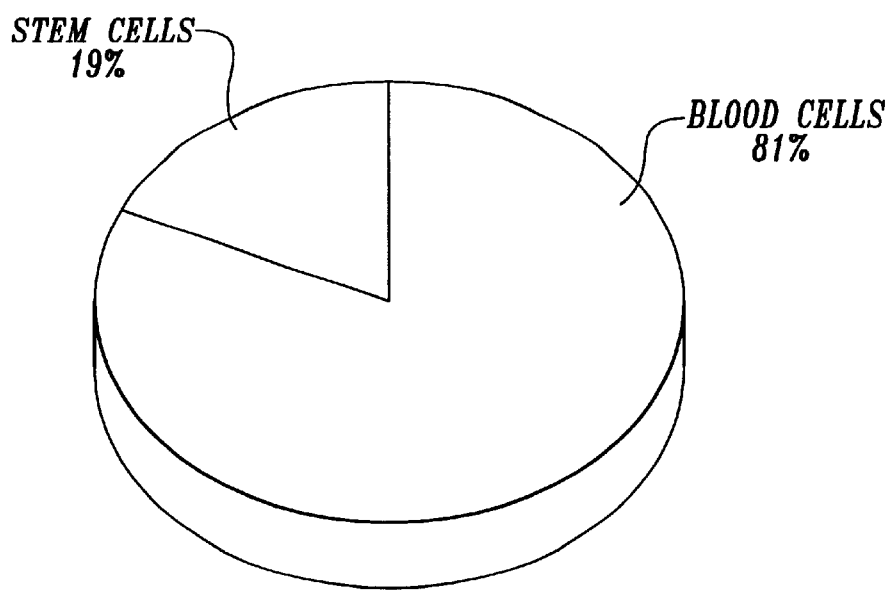

Referring now to FIG. 9, the indexing process 900 starts, at block 901, by separating the keywords from the sub-questions. For the purpose of demonstrating an illustrative example, the list of keywords in TABLE 39 relate to the sub-question of, "what are the most frequently used cells?" This search will be narrowed to a group of keywords in the time frame from 1996 till 1998.

TABLE 39

| | |
|---|---|
| 601 | Astrocytes |
| 31 | Blood Cells |
| 95 | Hair Cells |
| 423 | Interneurons |
| 53 | Lymphocytes |
| 82 | Microglia |
| 1,084 | Motor Neurons |
| 353 | Neuroglia |
| 4,964 | Neurons |
| 823 | Neurons, Afferent |
| 67 | Neurons, Efferent |
| 268 | Oligodendroglia |
| 257 | Purkinje Cells |
| 274 | Pyramidal Cells |
| 328 | Retinal Ganglion Cells |
| 173 | Schwann Cells |
| 23 | Stem Cells |
| 17 | T-Lymphocytes |

Next, at a step 903, the process continues where it indexes keywords according to a database keyword tree structure. This process can be carried out before or after the separation step 901. Following the selection of one of the data sets of TABLE 38, either the 1st, 2nd, or 3rd set of data, the software executed on the computing device is used to input the data into a template file containing the keyword tree structure. If one of the sub-questions being addressed is, "what are the most frequently used cells used in Clinical Neurology," the process should use two files. The first file should contain the keywords and their respective numbers (impact factor, frequency or impact factor multiplied by frequency; outputs number 1, 2 or 3). TABLE 39 is an example representing the list of cells found in our search using output number 2. The second file is the template file containing the keyword tree structure. The following is an example on how neuroglia and neuron cells are arranged according to the National Library of Medicine thesaurus keyword tree structure used by MEDLINE.

TABLE 40

Neuroglia
    Astrocytes
    Microglia
    Neuropil
        Neuropil Threads
    Oligodendroglia
        Myelin Sheath
    Schwann Cells
        Myelin Sheath
            Neurilemma
            Ranvier's Nodes
Neurons
    Dendrites
        Neurites
    Growth Cones
    Interneurons TABLE 40-continued Lewy Bodies
Nerve Fibers
    Adrenergic Fibers
        Sympathetic Fibers, Postganglionic
    Autonomic Fibers, Postganglionic
        Parasympathetic Fibers, Postganglionic
        Sympathetic Fibers, Postganglionic
    Autonomic Fibers, Preganglionic
    Axons
        Neurites
        Presynaptic Terminals
            Mossy Fibers, Hippocampal
    Cholinergic Fibers
        Autonomic Fibers, Preganglionic
        Parasympathetic Fibers, Postganglionic
    Nerve Fibers, Myelinated
        Myelin Sheath
            Neurilemma
            Ranvier's Nodes
Neurofibrils
    Neurofibrillary Tangles
Neurons, Afferent
    Hair Cells
        Hair Cells, Inner
        Hair Cells, Outer
        Hair Cells, Vestibular
    Olfactory Receptor Neurons
    Photoreceptors
        Photoreceptors, Invertebrate
        Photoreceptors, Vertebrate
            Cones (Retina)
            Rods (Retina)
                Rod Outer Segments
    Retinal Ganglion Cells
Neurons, Efferent
    Motor Neurons
        Anterior Horn Cells
        Motor Neurons, Gamma
Neuropil
    Neuropil Threads
Nissl Bodies
Purkinje Cells
Pyramidal Cells
Senile Plaques Next, at a step 905, the process arranges each sub-question according to the National Library of Medicine thesaurus keyword tree structure. This step may need some knowledge of the user to receive a desired result. The following is the arrangement of the previous keywords. To better understand the purpose of this step cells have been categorized as neural cells and non-neural cells.

TABLE 41

Neural Cells
    353 Neuroglia
        601 Astrocytes
        82 Microglia
        268 Oligodendroglia
        173 Schwann Cells
    4,964 Neurons
        423 Interneurons
        823 Neurons, Afferent
            95 Hair Cells
            328 Retinal Ganglion Cells
        67 Neurons, Efferent
            1,084 Motor Neurons
        257 Purkinje Cells
        274 Pyramidal Cells
Non-neural Cells
    23 Stem Cells
    31 Blood Cells
        53 Lymphocytes
            17 T-Lymphocytes Next, at a step 907, as the keyword tree is arranged, the lower hierarchical keyword numbers should be added upwards into the hierarchy. The reason for this procedure is that very often an intermediate keyword in the tree structure might be scoreless while underneath it there are keywords with tagged numbers. Therefore, in reality the scoreless keyword should in actuality contain a number. For example the 17 keywords of T-Lymphocytes will be added to the 53 Lymphocytes set making it 70 Lymphocytes. The 70 Lymphocytes will now be added to the 31 Blood Cells making 101 Blood Cells. Finally, the 101 Blood Cells will be added to the 23 Stem Cells to make 124 Non-neural Cells. Following with our example the arranged keyword tree would look like the example of TABLE 42.

TABLE 42

9,792 Neural Cells
    1,477 Neuroglia
        601 Astrocytes
        82 Microglia
        268 Oligodendroglia
        173 Schwann Cells
    8,315 Neurons
        423 Interneurons
        1,246 Neurons, Afferent
            95 Hair Cells
            328 Retinal Ganglion Cells
        1,151 Neurons, Efferent
            1,084 Motor Neurons
        257 Purkinje Cells
        274 Pyramidal Cells
124 Non-neural Cells
    23 Stem Cells
    101 Blood Cells
        70 Lymphocytes
            17 T-Lymphocytes Then, as shown at a step 909, the process continues where the keyword groups are sorted numerically and arranged in a decreasing manner. Our example would look like the data of TABLE 43.

TABLE 43

9,792 Neural Cells
    8,315 Neurons
        1,246 Neurons, Afferent
            328 Retinal Ganglion Cells
            95 Hair Cells
        1,151 Neurons, Efferent
            1,084 Motor Neurons
        423 Interneurons
        274 Pyramidal Cells
        257 Purkinje Cells
    1,477 Neuroglia
        601 Astrocytes
        268 Oligodendroglia
        173 Schwann Cells
        82 Microglia
124 Non-neural Cells
    101 Blood Cells
        70 Lymphocytes
            17 T-Lymphocytes
    23 Stem Cells Next, as shown at a step 911, steps 901–909 are repeated for all other sub-questions. questions. Then, as shown at a step 913, steps 901–911 are all repeated in the database query limited by the number of group of years.

An important principle of the present retrieval system is to treat all years under the same conditions. Following the concept of equality shown in the application of a correction factor, correct each keyword with the correction factor described in that section.

Keyword Statistical Analysis According to a set of sub-questions

In relation to the data of TABLE 43, the data table now shows a hierarchical distribution of keyword cells. Using a non-specialized type of software like Microsoft® Word® or Excel® a pie chart can be made. This pie chart can be made by inputting directly the numbers shown in TABLE 43, which will be automatically converted into percentages by the software program. This step can be carried out by hand or automatically by the use of macros. Following the conversion into percentages TABLE 43, hierarchical distribution of keyword cells from the group of years of 1996–1998 will look like the data of TABLE 44.

TABLE 44

| | |
|---|---|
| 98.7% | Neural Cells |
| 84.9% | Neurons |
| 37.1% | Neurons, Afferent |
| 77.5% | Retinal Ganglion Cells |
| 22.4% | Hair Cells |
| 34.3% | Neurons, Efferent |
| 100% | Motor Neurons |
| 12.6% | Interneurons |
| 8.1% | Pyramidal Cells |
| 7.6% | Purkinje Cells |
| 15.0% | Neuroglia |
| 53.4% | Astrocytes |
| 23.8% | Oligodendroglia |
| 15.3% | Schwann Cells |
| 7.2% | Microglia |
| 1.2% | Non-neural Cells |
| 81.4% | Blood Cells |
| 100% | Lymphocytes |
| 100% | T-Lymphocytes |
| 18.5% | Stem Cells |

FIGS. 10A–10F illustrate the pie charts that can be drawn upon completion of percentage changes. The ability to draw these plots provides the user with a unique quantifiable tool to understand the current keyword's position (in our case the plots represent years 1996–1998). In the example shown in FIGS. 10A–10F it can be seen that 37% of the research efforts are being dedicated to study afferent neurons, followed by 34% on efferent neurons, 12% on interneurons and less than 10% on pyramidal and Purkinje cells. It can be seen that the addition of both the afferent and efferent neurons account for more than ⅔ of the neurons under investigation. This data would suggest to an individual researching on this type of cells that its human and economical resources should mimic the results exposed here. The next question that a user would then like to know is, "can he or she predict the future?" This question could be best addressed by comparing different groups of years and observe if these keywords have and upwards, stagnant or downwards trends. Thus, depending on the response the user would have another tool to make a forecast. If, for example, it would be seen that the quantity of afferent neurons hits has been going down for the last 9 years, whereas research on interneurons has been doing exactly the opposite, the user would be best advised to increase well over the 12% indicated for interneurons and decrease the efforts dedicated to research on afferent neurons to less than 30%. Following this type of advice the user has then maximized the usefulness of this type of data.

In addition, these types of plots allow the user to find out if the search has been successful since high background noise could compromise the significance of the overall results. High background noise refers to the concept of obtaining keywords totally unrelated to the subject in question. The present invention attempts to obtain trends with as low background noise as possible. For instance, our example on Clinical Neurology in this section shows 9,792 hits on Neural Cells and 124 hits on Non-neural Cells keywords. In this case Neural Cells represent 98.7% versus 1.2% of Non-neural Cells. Therefore, because 1.2% represents a very small number of keyword unrelated to the subject under study, it can be concluded that the Clinical Neurology strategy presented here had a very low background noise. Therefore,the results obtained will be highly representative and meaningful.

Trends of keywords. Temporal analysis

Let's imagine that the user is exploring the sub-question of, "which are the top pathological processes?" Within this sub-question for example an area known as Neurodegenerative Diseases needs to be analyzed. For this purpose three sets of data are gathered. The data has been grouped into three sets of three years each, spanning from 1990 till 1998. In order to show an example to the reader of this patent the number 2 output of these groups of years has been chosen, (counted by frequency).

TABLE 45

| Neurodegenerative diseases | |
|---|---|
| Frequency | Year (1990–1992) |
| 745 | Demyelinating Disease |
| 123 | Alzheimer Disease |
| 79 | Cerebellar Ataxia |
| 36 | Leigh Syndrome |
| 32 | Reye Syndrome |
| 12 | Prion Disease |
| Frequency | Year (1993–1995) |
| 397 | Demyelinating Disease |
| 379 | Alzheimer Disease |
| 87 | Prion Disease |
| 81 | Leigh Syndrome |
| 52 | Reye Syndrome |
| 39 | Cerebellar Ataxia |
| Frequency | Year (1996–1998) |
| 549 | Alzheimer Disease |
| 173 | Prion Disease |
| 126 | Demyelinating Disease |
| 78 | Reye Syndrome |
| 53 | Cerebellar Ataxia |
| 21 | Leigh Syndrome |

If the data is formatted in a single table the results become more obvious to the reader.

TABLE 46

| (1990–1992) | (1993–1995) | (1996–1998) | |
|---|---|---|---|
| 123 | 379 | 549 | Alzheimer Disease |
| 12 | 87 | 173 | Prion Disease |
| 745 | 397 | 126 | Demyelinating Disease |
| 32 | 52 | 78 | Reye Syndrome |
| 79 | 39 | 53 | Cerebellar Ataxia |
| 36 | 81 | 21 | Leigh Syndrome |

Figure 11:
FIG. 11 depicts one embodiment of an output of the system in the form of a bar chart, wherein the bar chart is formatted to indicate emerging and declining specialty topics according to different groups of years.

Further, these data can be plotted in the manner as shown in FIG. 11. Next, the process includes the interpretation of the data. The ability to draw these types of plots provides the user with a unique quantifiable tool to understand future keyword's projections. The comparison between different group of years provides an observation of trends. The trends of the past and present may be observed, along with the prediction of future trends. In some cases trends will show a steady increase with respect to time such as is the case of Alzheimer Disease suggesting that this keyword is on the rise. Thus, interested readers would be recommended to take notice of such a fact and perhaps increase the investment of human or financial resources accordingly. In sharp contrast, a steady decrease with respect to time will suggest that the keyword is losing interest within the scientific community. Thus, interested readers would be recommended to take notice of such a fact and perhaps decrease the investment of human and financial resources accordingly.

Next, the process can help a user draw a comparison. This type of study can provide the user with additional information if the two types of questions being addressed, "what is happening on a specialized area of research?" and "what is at the forefront of a specialized area of research?" can be compared. Let's imagine that the user addresses the question of, "What is happening on the issue of clinical neurology?" Here, we use the selection of journals exposed in the method of FIG. 6A, whereas to study the question, "what is at the forefront on Clinical Neurology?" we use the selection of journals exposed in the method of FIG. 6B. In an example using data from output of the frequency (number of hits), the data of TABLE 47 is generated. TABLE 47 shows a sample of data in 1996–1998 showing the above results using the method of FIG. 6A addressing what is happening on Clinical Neurology-Degenerative Diseases?

TABLE 47

(1996–1998)
what is happening on Clinical Neurology-Degenerative Diseases?

| | |
|---|---|
| 549 | Alzheimer Disease |
| 173 | Prion Disease |
| 126 | Demyelinating Disease |
| 78 | Reye Syndrome |
| 53 | Cerebellar Ataxia |
| 21 | Leigh Syndrome |

Next, TABLE 48 shows the above results using the method of FIG. 6B addressing, what is at the forefront on Clinical Neurology- Degenerative Diseases? Generally, the number of hits will be different since the number of downloaded articles and the conditions used are also different.

TABLE 48

(1996–1998)
what is at the forefront on Clinical Neurology-Degenerative Diseases?

| | |
|---|---|
| 271 | Alzheimer Disease |
| 151 | Prion Disease |
| 37 | Demyelinating Disease |
| 35 | Reye Syndrome |
| 4 | Cerebellar Ataxia |
| 2 | Leigh Syndrome |

If these data sets are compared among themselves and changed into percentages the data would look like the following:

TABLE 49

(1996–1998)
what is happening on Clinical Neurology-Degenerative Diseases?

| | |
|---|---|
| 54.9% | Alzheimer Disease |
| 17.3% | Prion Disease |
| 12.6% | Demyelinating Disease |
| 7.8% | Reye Syndrome |

TABLE 49-continued

| | |
|---|---|
| 5.3% | Cerebellar Ataxia |
| 2.1% | Leigh Syndrome |

(1996–1998)
what is at the forefront on Clinical Neurology-Degenerative Diseases?

| | |
|---|---|
| 54.2% | Alzheimer Disease |
| 30.2% | Prion Disease |
| 7.4% | Demyelinating Disease |
| 7.0% | Reye Syndrome |
| 0.8% | Cerebellar Ataxia |
| 0.4% | Leigh Syndrome |

Figure 12:
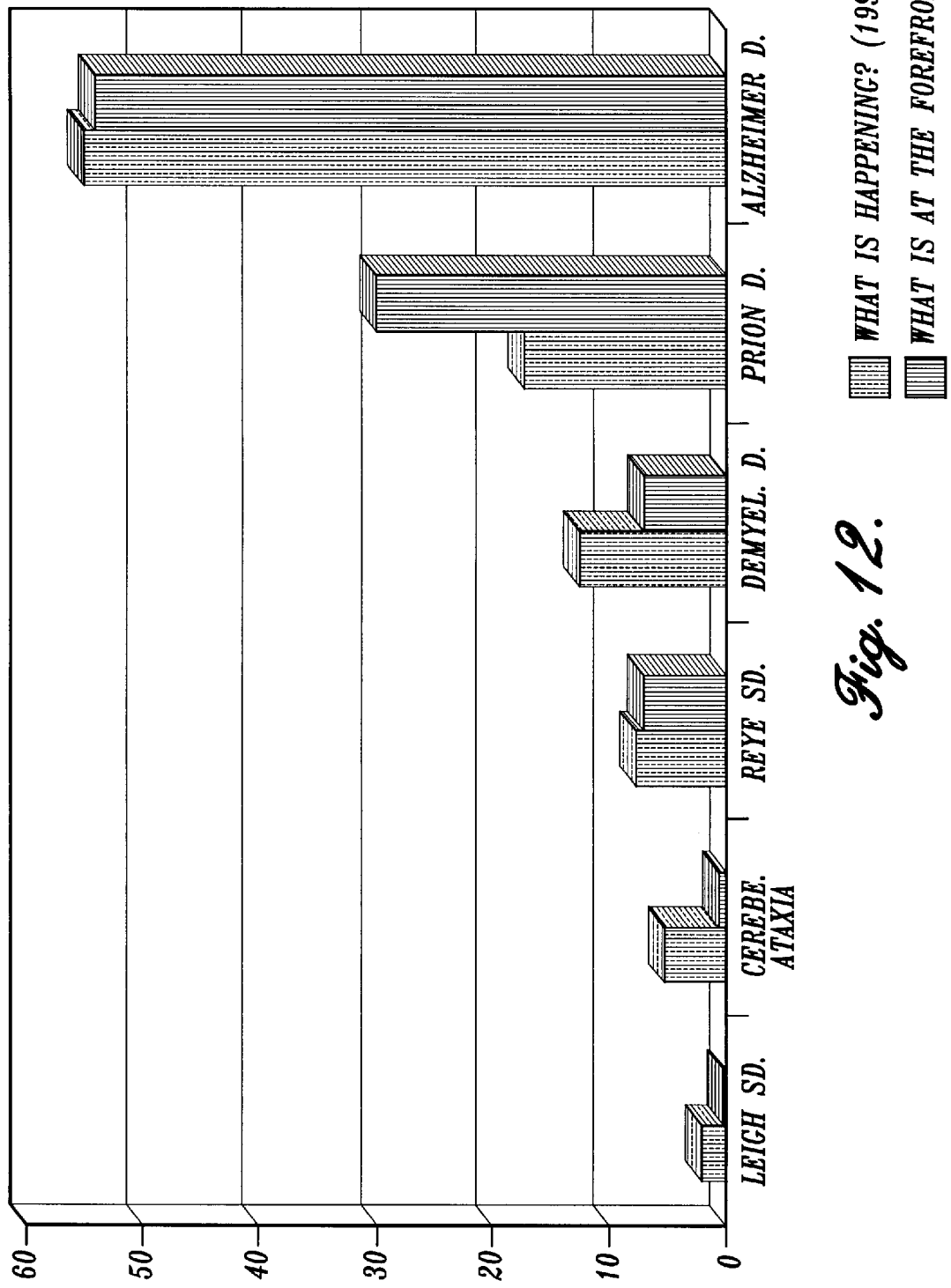
FIG. 12 is another embodiment of an output of the system in the form of a bar chart, wherein the bar chart is formatted to indicate what is happening in a field and what is the forefront of a topic.

FIG. 12 illustrates this data using a chart showing the trend more clearly. From this chart, a user can see that the order in which the different keywords are arranged remain in the same position. Alzheimer Disease's data indicate that the same level of prominence (54%) can be observed in both searches. All other keywords in the file of "what is at the forefront?" show a decrease in the level of their importance with respect to the file "what is happening?" This fact occurs at the expense of Prion Disease, which is the one keyword showing a significant increase in "what is at the forefront?" This important fact validates the observations made before and reinforces the fact that we underestimated the value of Prion Disease. Therefore, the user should take note of this comparative data and further increase the initial resources allocated to Prion Disease accordingly. This fact can be confirmed if a trend chart can be plotted with the groups of years regarding the question, "what is at the forefront of Clinical Neurology-Degenerative Disease?"

If the user would now compare the trends of both questions he/she could have a final chart that would confirm or deny previous statements. The following are the two charts of, "what is happening on Clinical Neurology-Degenerative Diseases?" and "what is at the forefront of Clinical Neurology-Degenerative Disease?" from 1990–1998 with data from the second set of data in TABLE 45. To simplify the example, only the data pertaining to Alzheimer Disease, Prion Disease and Demyelinating Disease are present in the chart. In order to distinguish one question from the other a letter at the front of the Disease H or F, indicates whether the result corresponds to the question what is happening on Clinical Neurology-Degenerative Diseases versus, "what is at the forefront of Clinical Neurology-Degenerative Disease?" respectively.

Figure 13:
FIG. 13 is another embodiment of an output of the system in the form of a bar chart, wherein the bar chart is formatted to indicate emerging and declining specialty topics according to different groups of years.

From the chart of FIG. 13, it can be seen that both questions complement each other since all the columns present on the chart have similar values. The user should notice that in F Prion Disease all the percentage results are higher than in H Prion Disease. This fact is important since the data in the file represents, "what is at the forefront of clinical neurology-degenerative disease?" The data also represents the leading indicator for the most innovative changes in the subject, specifically, it suggests that Prion Disease is a Disease on the rise for future studies. The user should therefore try to accommodate more resources to investigate this disease since it is unlikely that it has reached its maximum growth level. Similarly to F Prion Disease, from 1990 till 1995 the percentage results in F Alzheimer Disease have also been growing at a faster rate than in H Alzheimer Disease and therefore these data confirms that this area is getting "hot". Since both H and F have also shown growth during the period of time from 1996 till 1998 it can be concluded that Alzheimer Disease is definitely a research area of interest. Importantly, the data show that the percentages between F and H in Alzheimer Disease during the latter time period are very similar. In fact, F Alzheimer Disease is slightly lower than H Alzheimer Disease. These facts would suggest that Alzheimer Disease has peaked in its growth pattern and possibly has reached a plateau phase. In turn the user would probably be well advised to invest his/her human and economical resources to a similar level (approximately 55%). While Prion Disease and Alzheimer Disease growing rates have been growing, the opposite has been happening to Demyelinating Disease. Both H and F Demyelinating Disease reflect that fact. Interestingly, the decreasing rates shown in F Demyelinating Disease have been going faster than H Demyelinating Disease rates and since the period covered from 1996 till 1998 in F Demyelinating Disease has been going faster than H Demyelinating Disease it would suggest that the decline in research interest observed in this Disease is not yet over. The user would perhaps want to accommodate for these probable changes by making further cuts in human and economical resources dedicated to investigate this disease.

In order to profit for the extraordinary abundance of data supplied by both type of questions (H and F) the user could continue comparing data between them in an upward hierarchical direction. Thus, the user could next compare Neurodegenerative Diseases to all other diseases of its class. Following these studies he/she could compare Central Nervous System Diseases to all other Diseases and so forth.

In summary, comparison of both type of systems provides a method to know the time periods where an area is still growing, reaching a plateau, stagnant or that our interest is still declining.

As described above, there are many different embodiments that can be used to analyze the database content. The following summaries describe the preferred embodiments of the present invention.

Embodiment I

One embodiment is best utilized to study the keyword trends that a specific journal(s) uses. For this reason, no pre-search is required. This type of search will provide the user with a study on the state of the art of a specific journal or type of journals. The process involves the input of the name of the journal to be investigated, removal of the none-original articles such as editorials, news, comments, etc from the query built in the retrieval process, limiting the query by the different years to be investigated, and limiting the articles according to the years or group of years to be investigated. The steps of FIG. 4 allow the process to utilize the frequency output number shown in TABLE 15. The process accounts for all of the focused keywords, calculates the correction factor, and applies it to the method illustrated in FIG. 8. The process then indexes the keywords obtained and proceeds with the statistical analysis as explained in with respect to the statistical analysis section.

Interesting comparisons between the top specialty journal according to impact factor and the journal under investigation is possible. Furthermore, comparisons between the queried journal and the top non-specialty journals would provide novel information for the user as to where the journal under investigation might be heading in the near future. It is a well known fact that journals with lower impact factor tend to follow the trends established by high impact factor journals. This process usually takes a few years.

Embodiment II

This embodiment is best suited for the study of a keyword or a small set of keywords that do not require a pre-search to find out the specialized area keywords. The purpose is to find out the keywords that this keyword, or set of keywords, relate to. Thus, this embodiment does not require to select any journals from the database since the user wishes to know which keywords relate to its query regardless of where they are published. Input the keyword(s) into the query and remove none-original articles such as editorials, news, and comments from the query, limit it by the different years to be investigated and download the articles according to the years or group of years to be investigated. This process accounts for all of the focused keywords. The process of this embodiment then calculates a correction factor and applies it following a pre-indexing process. The process then continues to the index step to sort the keywords. The process then proceeds with the statistical analysis.

This type of investigation provides the user with a tool to know which are the areas related to the keyword or small set of keywords under investigation. One interesting aspect of it is to find out new correlations of this keyword(s) with unsuspected topics. This type of search is particularly appealing to anyone searching for new uses. For instance, very often pharmaceutical compounds have multiple applications. Novel research that applies to a related compound to the one being investigated might be picked up by the user's search since they might be sharing higher hierarchical keywords.

Embodiment III

This embodiment combines the specialized keywords and a selection of all the specialty journals available with the top non-specialty journals with the highest impact factor than the best specialized journal as described with the processes illustrated in FIGS. 4, 5, 6B and 7. The question best addressed with this system is "what is happening in a specialized area of research?"

Embodiment IV

This embodiment is directed at addressing the question of "what is at the forefront of a specialized area?" It combines the top non-specialized journals with the specialized keywords of the subject under investigation using the impact factor output. The results obtained in this search will indicate to the user the most relevant keywords associated to the subject investigated since it is a well accepted fact that scientists strongly gravitate towards publishing in the top journals. Furthermore, it is also evident that most if not all of the most important discoveries in a specialized area of research are not published in the specialty journals but in journals with the highest impact factor.

Embodiment V

In a similar fashion as the previous embodiment, the fifth embodiment is directed at identifying the question of "what is at the forefront of a specialized area?" It combines all the journals available with the specialized keywords of the subject under investigation using the impact factor output.

Embodiment VI

This embodiment combines all the keywords used by the database with a set of top journals. This type of search will be used to know the relative importance of keywords with respect to each other. Input a set of the top journals, for example, the user might decide that since the journals with the highest impact factors are the ones that are most read by the scientific community and also contain the articles that are continuously breaking new ground to arbitrarily decide to set a journal cut-off impact factor line. Given that databases, like MEDLINE, contain thousands of different journals the user might decide to use the journals with an impact factor higher than 3.000 points. That would account for approximately the top 200 journals. Thus, this search will identify the relative importance of all the keywords. The method starts by grouping all these journals using an "OR" boolean term and by removing none-original articles and selecting the years of interest. At this point the query has been able to group our query into a single line that for better explanatory purposes will be named "cleaned journals." Follow the query by inputting all the keywords of the database. Approximately, 15,000 keywords exist in the thesaurus of MEDLINE. Proceed by combining every single keyword with the "cleaned journals" and download all the results.

Following the downloading procedure, the data can copied into a program such as like Microsoft Excel and proceed with a cut and paste to align the keywords with the combination of "cleaned journals." The procedure will look like the following:

TABLE 50

| Database Keywords | Keyword hits | Keywords + "Cleaned Journal" hits |
|---|---|---|
| *Abattoirs/ | 26 | 2 |
| *Abbreviated Injury Scale/ | 348 | 8 |
| *ABC Transporters/ | 6,893 | 4,267 |
| *Abdomen/ | 28,092 | 1,326 |
| *Abdomen, Acute/ | 14,983 | 246 |
| *Abdominal Abscess/ | 2,475 | 68 |
| ... | ... | ... |
| ... | ... | ... |

The user can proceed to take the percentages to know the relative importance of the keywords. Divide the column titled Keyword+"Cleaned journals" hits with the one titled Keyword hits. The table will look like the following:

TABLE 51

| Database keywords | Keyword hits | Keywords + "Cleaned journals" hits | % |
|---|---|---|---|
| *Abattoirs/ | 26 | 2 | 7.6% |
| *Abbreviated Injury Scale/ | 348 | 8 | 2.2% |
| *ABC Transporters/ | 6,893 | 4,267 | 61.9% |
| *Abdomen/ | 28,092 | 1,326 | 4.7% |
| *Abdomen, Acute/ | 14,983 | 246 | 1.6% |
| *Abdominal Abscess/ | 2,475 | 68 | 2.7% |
| ... | ... | ... | ... |
| ... | ... | ... | ... |

Remove the column titled Keyword hits. The table will look like the following:

TABLE 52

| Database keywords | Keywords + "Cleaned journals" hits | % |
|---|---|---|
| *Abattoirs/ | 2 | 7.6% |
| *Abbreviated Injury Scale/ | 8 | 2.2% |
| *ABC Transporters/ | 4,267 | 61.9% |
| *Abdomen/ | 1,326 | 4.7% |
| *Abdomen, Acute/ | 246 | 1.6% |
| *Abdominal Abscess/ | 68 | 2.7% |
| ... | ... | ... |
| ... | ... | ... |

Further separate the table by doing two tables, one containing the Database keywords with the column titled Keyword+"Cleaned journals" hits and another one with the Database keywords with the column titled %. Both tables would look like the following:

TABLE 48

| Database keywords | Keywords + "Cleaned journals" hits |
|---|---|
| *Abattoirs/ | 2 |
| *Abbreviated Injury Scale/ | 8 |
| *ABC Transporters/ | 4,267 |
| *Abdomen/ | 1,326 |
| *Abdomen, Acute/ | 246 |
| *Abdominal Abscess/ | 68 |
| ... | ... |
| ... | ... |

| Database keywords | % |
|---|---|
| *Abattoirs/ | 7.6% |
| *Abbreviated Injury Scale/ | 2.2% |
| *ABC Transporters/ | 61.9% |
| *Abdomen/ | 4.7% |
| *Abdomen, Acute/ | 1.6% |
| *Abdominal Abscess/ | 2.7% |
| ... | ... |
| ... | ... |

Embodiment VII

Besides keywords, one embodiment of the present invention also allows the user to extract further information from the database. Other fields of interest include authors, institutions, registry numbers, etc. Questions that might be of interest to some scientists might involve to know "who are the top scientists, institutions, etc.?" Select a set of keywords in a pre-search to find out the keywords of a specialized area and combine them with a specific set of journals following the procedures exposed. The user should remove non-original articles and to limit the search by years. Downloading would occur, but this time all the available fields would be downloaded. Because a correction factor is irrelevant in this case the user can proceed with tagging procedures. Besides tagging focused keywords according to impact factor also tag all the authors, institutions, etc. The following is a MEDLINE example of an article showing some fields:

TABLE 54

<1>
Authors
    Saitta AM. Soper PD. Wasserman E. Klein ML.
Institution
    Center for Molecular Modeling, Department of Chemistry, University of Pennsylvania, Philadelphia 19104-6202, USA.
Title
    Influence of a knot on the strength of a polymer strand.
Source
    Nature. 399(6731): 46–8, 1999 May 6.
MeSH Subject Headings
    *Alkanes/ch [Chemistry]
    Carbon/ch [Chemistry]
    Computer Simulation
    Models, Chemical
    Molecular Structure
    *Polymers/ch [Chemistry]
    Structure-Activity Relationship
    Support, U.S. Gov't, Non-P.H.S.
    Temperature
Registry Numbers
    0 (Alkanes). 0 (Polymers). 124-18-5 (decane). 7440-44-0 (Carbon).
    ...

Example of a downloaded article with its tagged fields corresponding to their journal impact factor. The journal Nature has an impact factor of 27.368.

TABLE 55

```
<1>
Authors
    27.368 Saitta AM. 27.368 Soper PD. 27.368 Wasserman E. 27.368
    Klein ML.
Institution
    27.368 Center for Molecular Modeling, Department of Chemistry,
    University of Pennsylvania, Philadelphia 19104-6202, USA.
Source
    Nature. 399(6731): 46–8, 1999 May 6.
MeSH Subject Headings
    27.368   *Alkanes/ch [Chemistry]
             Carbon/ch [Chemistry]
             Computer Simulation
             Models, Chemical
             Molecular Structure
    27.368   *Polymers/ch [Chemistry]
             Structure-Activity Relationship
             Support, U.S. Gov't, Non-P.H.S.
             Temperature
    . . .
    . . .
```

In order to help the reader understand the next steps only the author's field will be explained. All other fields need to be removed using a suitable computer program. The articles would look like the following:

TABLE 56

| | |
|---|---|
| 27.368 | Saitta AM. |
| 27.368 | Soper PD. |
| 27.368 | Wasserman, E. |
| 27.368 | Klein ML. |
| . . . | |
| . . . | |

Next step involves the separation of every author. In other words one author per line. It would look like the following:

TABLE 57

| | |
|---|---|
| 27.368 | Saitta AM. |
| 27.368 | Soper PD. |
| 27.368 | Wasserman, E. |
| 27.368 | Klein ML. |
| . . . | |
| . . . | |

Once the process has reached this point, further analysis of the data can be obtained by using the steps 421–425 of FIG. 4. From here, the statistical analysis can be carried out.

While the preferred embodiment of the invention has been illustrated and described, it will be appreciated that various changes can be made therein without departing from the scope of the invention. It is therefore intended that the scope of the invention be determined from the following claims and equivalents thereto.

The embodiments of the invention in which an exclusive property or privilege is claimed are defined as follows:

1. A method of analyzing research trends, comprising:
   (a) selecting plurality of keywords associated with a trend;
   (b) searching a database of preselected keywords, wherein the preselected keywords are generated from a plurality of publications;
   (c) associating each keyword with a value indicative of the prestige of the publications in which the keywords appear;
   (d) determining a quantified value by summing the value indicative of the prestige associated with each unique keyword, thereby creating a prestige total associated with each unique keyword, summing the number of times a keyword appears in the plurality publications, thereby creating a frequency total for each unique keyword, and multiplying each frequency total with the prestige total associated with each unique keyword, thereby creating the quantified value; and
   (e) determining the research trends based on the quantified value.

2. The method of claim 1, wherein the database further comprises specific and nonspecific keywords, wherein the method further comprises, separating the specific keywords from the nonspecific keywords.

3. The method of claim 1, wherein the research trends are determined by predicting future growth trends.

4. The method of claim 1, wherein the value indicative of the prestige of the publications is an impact factor.

5. The method of claim 1, wherein the value indicative of the prestige of the publications is a publication cited half-life value.

6. The method of claim 1, wherein the value indicative of the prestige of the publications is an immediacy index value.

7. The method of claim 1, wherein the searching step includes a search of documents based on a search prioritized by the publication date of each of said documents.

8. The method of claim 1, wherein the searching step includes the use of keywords of a specialized area.

9. The method of claim 1 wherein the predetermined topic is related to a field of authors.

10. The method of claim 1 wherein the predetermined topic is related to a field of institutions.

11. The method of claim 1, wherein the searching step, comprises:
    identifying a group of specialty journals;
    entering the group of speciality journals into a database query, wherein the database query is executed on the database to retrieve a plurality of articles, wherein each article of the plurality of articles contains a plurality of keywords associated with the article;
    associating each article title with a corresponding factor value; and
    associating each keyword in each article with the factor value associated with the article containing the keyword.

12. The method of claim 11, further comprising the step of removing the non-focused keywords.

13. The method of claim 11, further comprising the step of removing the sub-headings from the plurality of keywords.

14. The method of claim 11, wherein the factor value is an impact factor value associated with a publication.

15. The method of claim 11, wherein the factor value is a publication cited half-life value.

16. The method of claim 11, wherein the factor value is a immediacy index value.

17. The method of claim 11, wherein the factor value equal to the number of times each keyword is cited in the plurality of articles.

18. The method of claim 11, further comprising,
    selecting a plurality of top keywords from said plurality of keywords based on the quantified value.

19. The method of claim 18, wherein the research trends are determined by:
    producing a chart from the number of occurrences each time a unique keyword appears, the multiplying factor, and the impact factor, thereby creating a chart pattern; and determining if the chart pattern is of an increasing value, and if so, concluding that a topic related to the keywords is emerging.

20. The method of claim 18, further comprising the step of determining if the chart pattern is of a decreasing pattern, and if so, concluding that the topic related to the keyword is declining.

21. The method of claim 1, wherein the searching step, comprises:

selecting a plurality of keywords from a tree structure in a bibliographic database, wherein the tree structure in a bibliographic database provides a plurality of subcategory keywords;

selecting a plurality of related keywords from the plurality of keywords and the plurality of subcategory keywords; and entering the plurality of related keywords into a database query, wherein the database query is executed on the database to retrieve a plurality of articles.

22. The method of claim 21, further comprising the step of removing a plurality of non-focused keywords from the plurality of related keywords.

23. The method of claim 1, wherein the searching step, comprises, selecting a plurality of journal titles from a list of specialty journal titles, wherein the selection process is based on an impact factor.

24. The method of claim 1, wherein the searching step, comprises, selecting a plurality of journal titles from a list of non-specialty journal titles, wherein the selection process is based on an impact factor.

25. The method of claim 1, wherein the searching step, comprises, selecting a plurality of journal titles from a list of a plurality of specialty and non-specialty journal titles, wherein the selection of journal titles occurs if, a corresponding impact factor of the selected non-specialty journal is greater than the impact factor of any specialty journals.

* * * * *

UNITED STATES PATENT AND TRADEMARK OFFICE
CERTIFICATE OF CORRECTION

PATENT NO.    : 6,385,611 B1
DATED         : May 7, 2002
INVENTOR(S)   : C. Cardona It is certified that error appears in the above-identified patent and that said Letters Patent is hereby corrected as shown below:

Title page,
Item [56], References Cited, U.S. PATENT DOCUMENTS, insert in appropriate order:

| | | |
|---|---|---|
| -- 5,732,260 | 3/1999  | Nomiyama |
| 5,321,833    | 6/1994  | Chang et al. |
| 5,893,092    | 4/1999  | Driscoll |
| 5,548,699    | 8/1996  | Ishida et al. |
| 5,293,552    | 3/1994  | Aalbersberg |
| 5,832,526    | 11/1998 | Schuyler |
| 5,970,486    | 10/1999 | Yoshida et al. -- |

OTHER PUBLICATIONS, "Garfield, E., "Citation Analysis as a Tool in Journal Evaluation, Journals can be ranked by frequency and impact of citations for science policy studies," *Science* 178:471-479, Nov. 1972." should read -- Garfield, E., "Citation Analysis as a Tool in Journal Evaluation. Journals can be ranked by frequency and impact of citations for science policy studies," *Science* 178:471-479, Nov. 1972. --

"Dellon, L. et al., Impact of the Journal Plastic and Reconstructive Surgery, Plastic and Reconstructive Surgery 90:717-722, Oct. 1992." should read -- Dellon, L. et al., Impact of the Journal *Plastic and Reconstructive Surgery*, Plastic and Reconstructive Surgery 90:717-722, Oct. 1992. --

"Dame. M.A. and Wolinsky, F.D., "Communication: Rating Journals in Health Care Administration--The Use of Bibliometric Measures, "*Medical Care* 31(6):520-524, 1993." should read -- Dame, M.A. and Wolinsky, F.D., "Communication: Rating Journals in Health Care Administration--The Use of Bibliometric Measures," *Medical Care* 31(6):520-524, 1993. --

"Welljams-Dorof,A. "Biological sciences in Chile and South America, 1981-1991: A citationist perspective. Output data and specialty are impact trends," *Biol. Re.* 27:91-103, 1994." should read -- Welljams-Dorof, A. "Biological sciences in Chile and South America, 1981-1991: A citationist perspective. Output data and specialty are impact trends, "*Biol. Res.* 27:91-103, 1994. --

Column 45,
Line 60, "selecting plurality" should read -- selecting a plurality --

UNITED STATES PATENT AND TRADEMARK OFFICE
CERTIFICATE OF CORRECTION

PATENT NO. : 6,385,611 B1
DATED : May 7, 2002
INVENTOR(S) : C. Cardona

It is certified that error appears in the above-identified patent and that said Letters Patent is hereby corrected as shown below:

Column 46,
Line 5, "plurality publications" should read -- plurality of publications --
Line 33, "searching step," should read -- searching step --

Signed and Sealed this

Twelfth Day of November, 2002

*Attest:*

*Attesting Officer*

JAMES E. ROGAN
*Director of the United States Patent and Trademark Office*